United States Patent [19]
Hicks et al.

[11] Patent Number: 5,607,122
[45] Date of Patent: Mar. 4, 1997

[54] TAIL ROTOR AUTHORITY CONTROL FOR A HELICOPTER

[75] Inventors: Duane L. Hicks, Keller; William L. McKeown, Euless; Tommie L. Wood, Arlington, all of Tex.

[73] Assignee: Bell Helicopter Textron Inc., Fort Worth, Tex.

[21] Appl. No.: 362,245

[22] Filed: Dec. 22, 1994

[51] Int. Cl.⁶ .................................................. B64C 27/00
[52] U.S. Cl. .................... 244/17.19; 244/17.13; 244/17.21
[58] Field of Search .................... 244/52, 52 A, 244/17.13, 17.19, 17.21, 230, 232, 221, 223; 416/42, 37

[56] References Cited

U.S. PATENT DOCUMENTS

| | | | |
|---|---|---|---|
| 2,209,879 | 7/1940 | Focke | 244/17.19 |
| 2,689,099 | 9/1954 | Lightfoot | 244/17.19 |
| 3,000,445 | 9/1961 | Stuart | 416/42 |
| 3,532,302 | 10/1970 | Dean | 244/17.19 |
| 3,558,081 | 1/1971 | Williams | 244/17.19 |
| 3,589,647 | 6/1971 | Burkham | 244/17.21 |
| 3,802,273 | 4/1974 | Helmuth et al. | 73/455 |
| 3,833,188 | 9/1974 | Robinson | 244/17.19 |
| 4,103,848 | 8/1978 | Johnson, Jr. et al. | 244/17.13 |
| 4,134,560 | 1/1979 | Messerschmidt | 244/17.25 |
| 4,340,335 | 7/1982 | Cheney | 416/138 |
| 4,347,997 | 9/1982 | Byham et al. | 244/17.19 |
| 4,493,465 | 1/1985 | Howlett et al. | 244/17.13 |
| 4,529,155 | 7/1985 | Bramwell et al. | 244/232 |
| 4,540,141 | 9/1985 | Durno et al. | 244/17.19 |
| 4,759,514 | 7/1988 | Burkham | 244/17.21 |
| 4,870,412 | 9/1989 | Vuichard | 416/42 |
| 4,881,874 | 9/1989 | White et al. | 416/138 |
| 5,067,668 | 9/1991 | Zuck | 244/7 |
| 5,131,604 | 7/1992 | Yoerkie, Jr. et al. | 244/17.19 |
| 5,188,511 | 2/1993 | Ebert | 416/25 |
| 5,265,825 | 9/1993 | Ebert et al. | 244/17.13 |
| 5,269,654 | 12/1993 | Chapman | 244/17.19 |
| 5,305,968 | 4/1994 | Arlton | 244/17.13 |
| 5,306,119 | 4/1994 | Bandoh et al. | 416/168 |

FOREIGN PATENT DOCUMENTS

| | | |
|---|---|---|
| 3412592 | 4/1984 | Germany . |
| 9302916 | 7/1992 | WIPO . |
| 9304419 | 8/1992 | WIPO . |

OTHER PUBLICATIONS

J. J. Cornish, III, Aeronautics, in Mark's Standard Handbook for Mechanical Engineers (E. A. Avallone & T. Baumaister, III, eds.); Ninth Ed., 1978, pp. 11–66 to 11–67.

Computer Patent Search Report (Unpublished), dated Dec. 8, 1994, pp. 1–38.

*Primary Examiner*—Andres Kashnikow
*Assistant Examiner*—Tien Dinh
*Attorney, Agent, or Firm*—Richards, Medlock & Andrews

[57] ABSTRACT

An apparatus for interconnection in a helicopter tail rotor control linkage for changing the pitch of the tail rotor blades in response to predetermined inputs is provided. The apparatus comprises a linkage member having a variable geometry, an actuator, and a control unit. In a preferred embodiment, the control unit utilizes a microcontroller to monitor inputs corresponding to ambient air condition and automatically vary the maximum tail rotor pitch so as to provide maximum tail rotor authority over a range of altitudes.

15 Claims, 19 Drawing Sheets

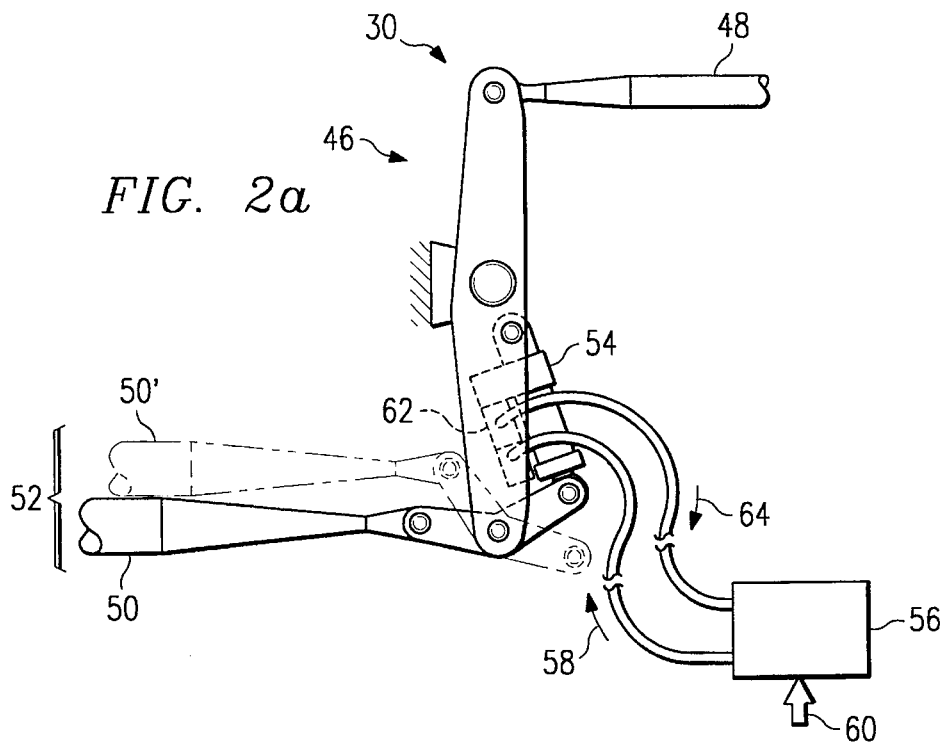
FIG. 2a
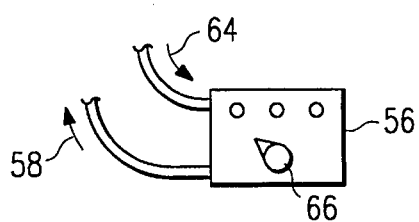
FIG. 2b
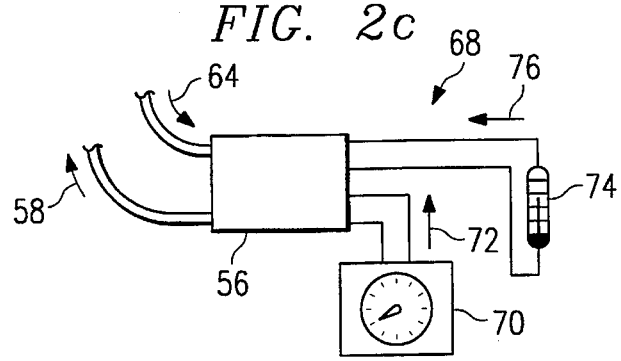
FIG. 2c
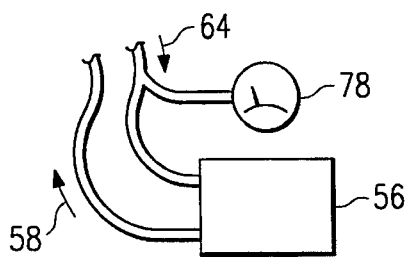
FIG. 2d
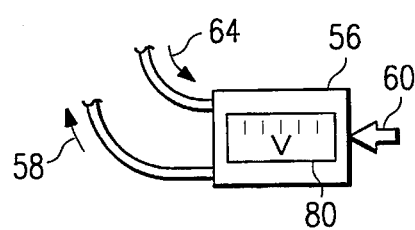
FIG. 2e
FIG. 2f

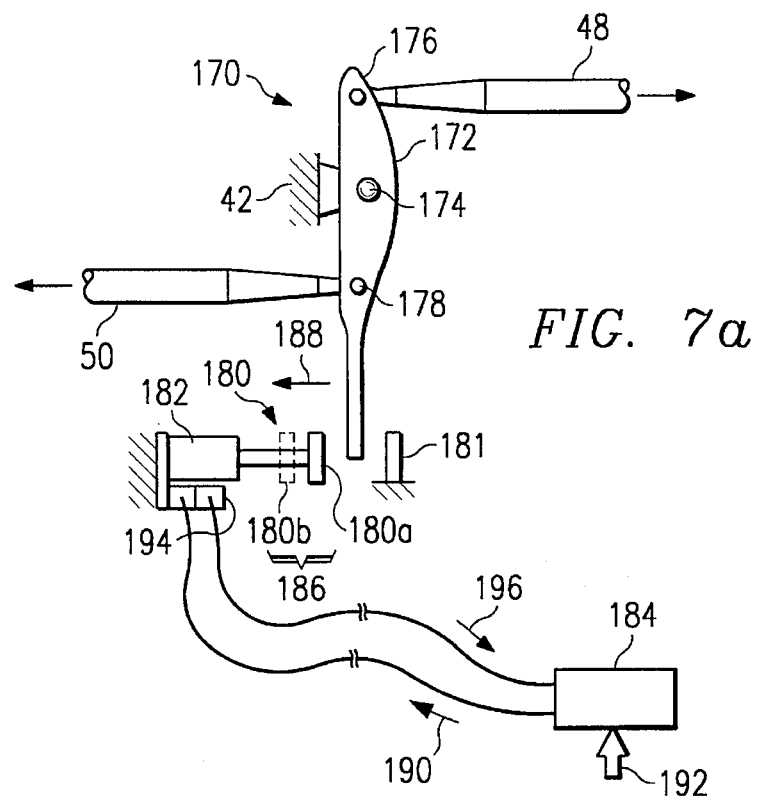
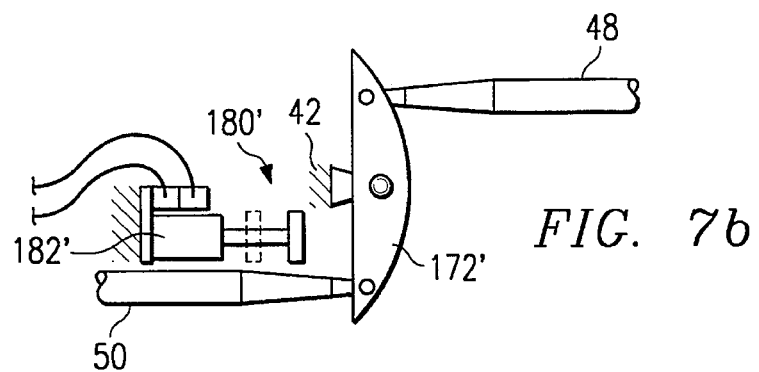
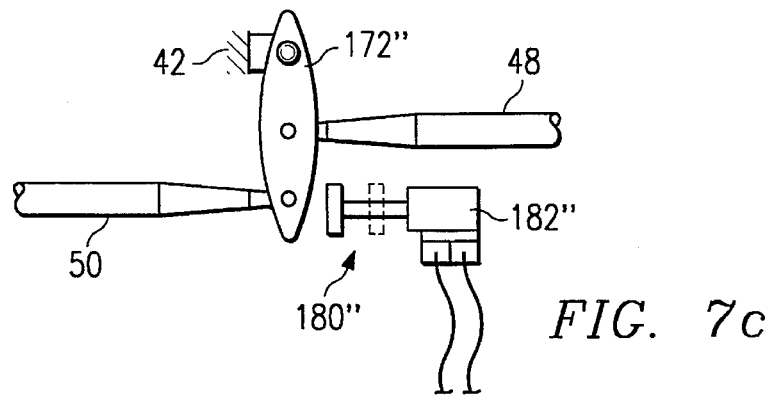

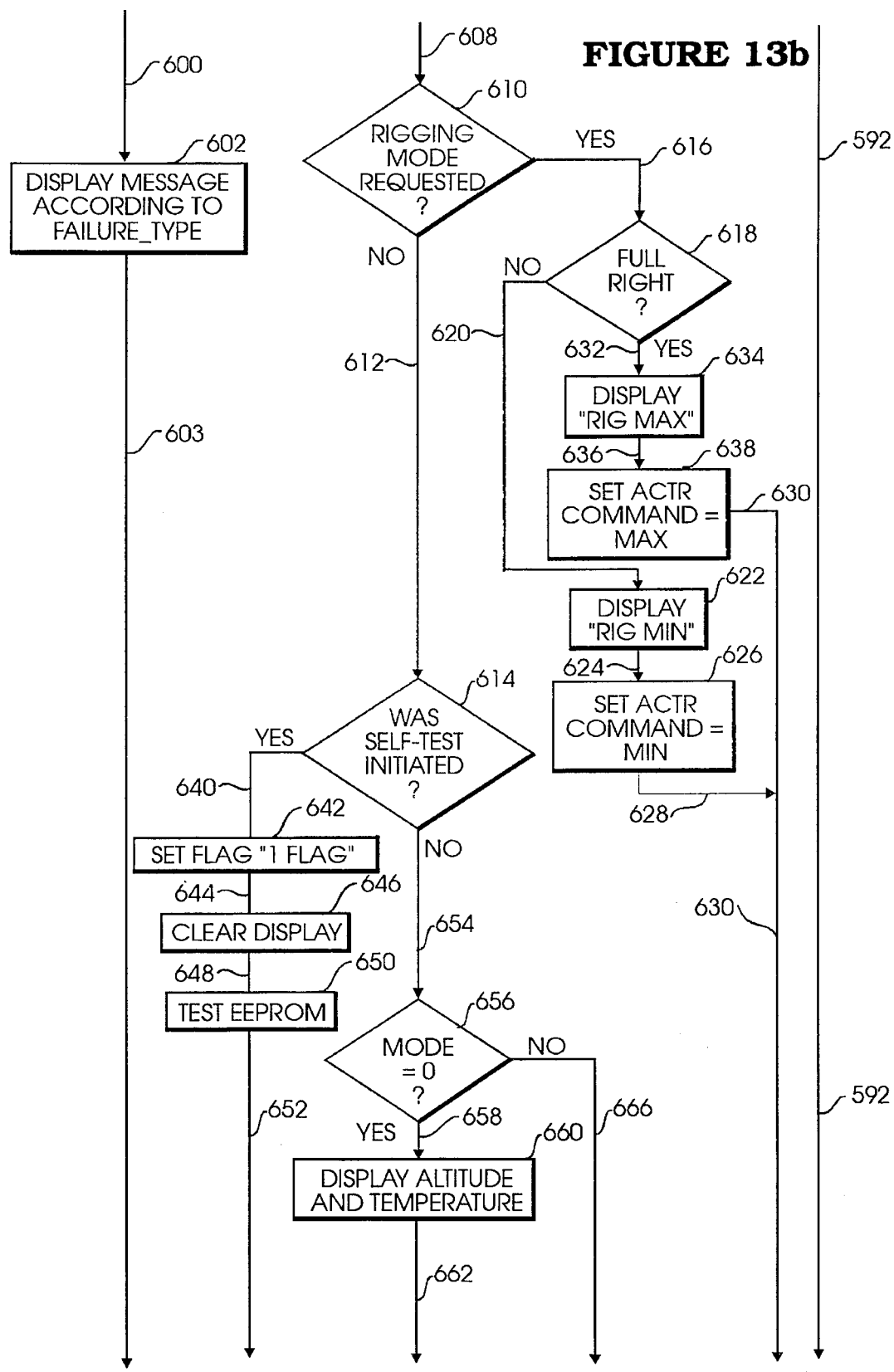

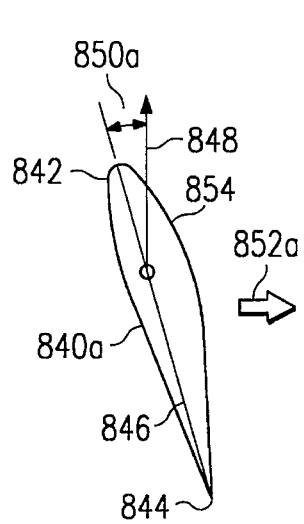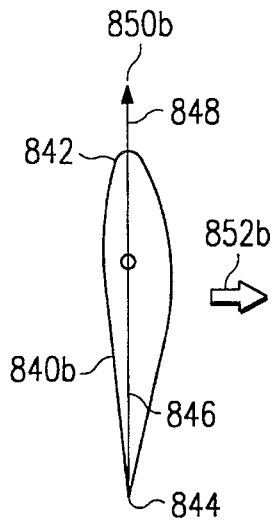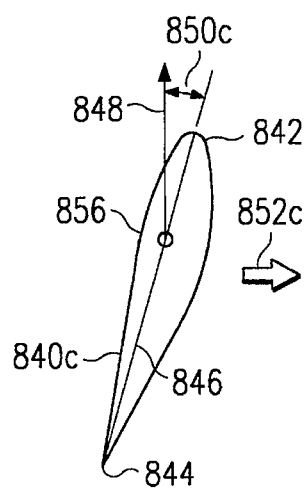
FIG. 16a    FIG. 16b    FIG. 16c
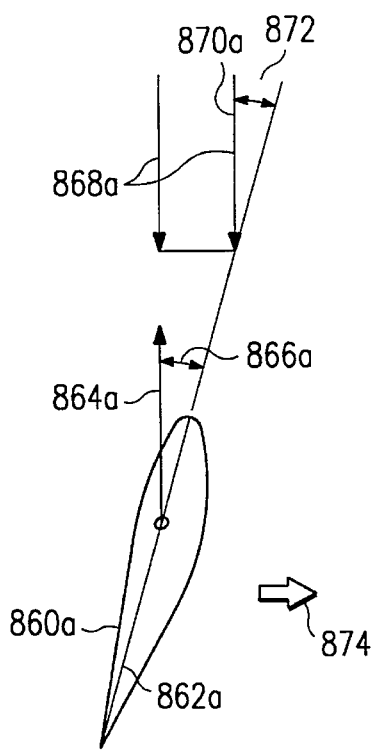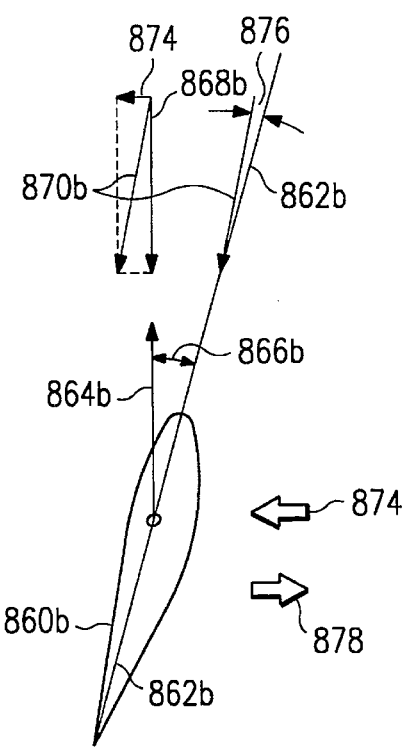
FIG. 17a    FIG. 17b

TAIL ROTOR AUTHORITY CONTROL FOR A HELICOPTER

TECHNICAL FIELD OF THE INVENTION

The present invention relates to controls for the tail rotor of a helicopter and in particular an apparatus for varying the maximum pitch of the tail rotor blades to optimize performance for varying ambient air conditions.

BACKGROUND OF THE INVENTION

A common configuration for a helicopter includes a first rotor, often called the main rotor or the lift rotor, rotating in a generally horizontal plane above the helicopter airframe and a second rotor, often called the tail rotor or anti-torque rotor, mounted on a tail boom and rotating in a generally vertical plane oriented to produce a sideways thrust in the direction of yaw. The pitch of the tail rotor blades, i.e., the angle between the chord line of the blade profile and the direction of rotation of the tail rotor, can be varied so as to increase or decrease the amount of sideways thrust produced by the tail rotor. The sideways thrust of the tail rotor serves three related purposes: first, since the tail rotor is located on a tail boom a distance from the main rotor, its sideways thrust produces a moment which serves to offset the torque produced on the airframe of the helicopter by the rotation of the main rotor blade; second, the sideways thrust of the tail rotor provides yaw axis control for the helicopter; and third, the sideways thrust of the tail rotor may work in conjunction with sideways thrust of the main rotor when the helicopter is translating laterally through the air.

The total sideways thrust produced by the tail rotor is known as the tail rotor authority. Factors affecting the total authority produced by a tail rotor include blade size and profile, rotational speed, angle of attack of the tail rotor blades, the pitch of the tail rotor blades, and the air density. The angle of attack is the angle between the chord line of the blade profile and the "relative wind", i.e., the direction at which the air approaches the tail rotor blade. This angle of attack is affected by the rotor blade pitch, the direction of travel of the helicopter and the presence of cross winds. A cross wind which reduces the angle of attack reduces the overall authority produced by the tail rotor, diminishing the control available to the pilot. The pitch is the angle between the chord line of the blade profile and the direction of blade rotation. The pitch is not affected by cross winds. The pilot controls the pitch of the tail rotor blades through the use of control pedals. Increasing the blade pitch results in greater tail rotor authority and decreasing the blade pitch results in less tail rotor authority. Air density also affects the tail rotor authority. Other factors being equal, the greater the air density, the greater the authority produced by the tail rotor, and similarly, the lower the air density, the less authority produced by the tail rotor. Since air density is difficult to measure directly, it is often calculated using equations based on the "standard atmosphere." The U.S. Standard Atmosphere is described in MARK's STANDARD HANDBOOK FOR MECHANICAL ENGINEERS, p. 11–67 (E. A. Avallone et al. eds., 9th ed. 1978), and Table 1 is excerpted therefrom. The U.S. Standard Atmosphere of Table 1 is a revised U.S. Standard Atmosphere, adapted by the United States Committee on Extension to the Standard Atmosphere (COESA) in 1962.

TABLE 1

| | | U.S. Standard Atmosphere | | | |
|---|---|---|---|---|---|
| Altitude h, ft* | Temp T, °F.† | Pressure ratio, $p/p_o$ | Density ratio $(\rho/\rho_o)$ | $(\rho_o/\rho)^{0.5}$ | Speed of sound $V_n$ ft/s ‡ |
| 0 | 59.00 | 1.0000 | 1.0000 | 1.000 | 1,116 |
| 5,000 | 41.17 | 0.8320 | 0.8617 | 1.077 | 1,097 |
| 10,000 | 23.34 | 0.6877 | 0.7385 | 1.164 | 1,077 |
| 15,000 | 5.51 | 0.5643 | 0.6292 | 1.261 | 1,057 |
| 20,000 | −12.62 | 0.4595 | 0.5328 | 1.370 | 1,036 |
| 25,000 | −30.15 | 0.3711 | 0.4481 | 1.494 | 1,015 |
| 30,000 | −47.99 | 0.2970 | 0.3741 | 1.635 | 995 |
| 35,000 | −65.82 | 0.2353 | 0.3099 | 1.796 | 973 |
| 36,089 | −69.70 | 0.2234 | 0.2971 | 1.835 | 968 |
| 40,000 | −69.70 | 0.1851 | 0.2462 | 2.016 | 968 |
| 45,000 | −69.70 | 0.1455 | 0.1936 | 2.273 | 968 |
| 50,000 | −69.70 | 0.1145 | 0.1522 | 2.563 | 968 |
| 55,000 | −69.70 | 0.09001 | 0.1197 | 2.890 | 968 |
| 60,000 | −69.70 | 0.07078 | 0.09414 | 3.259 | 968 |
| 65,000 | −69.70 | 0.05566 | 0.07403 | 3.675 | 968 |
| 65,800 | −69.70 | 0.05356 | 0.07123 | 3.747 | 968 |
| 70.000 | −67.30 | 0.04380 | 0.05789 | 4.156 | 971 |
| 75,000 | −64.55 | 0.03452 | 0.04532 | 4.697 | 974 |
| 80,000 | −61.81 | 0.02725 | 0.03553 | 5.305 | 977 |
| 85,000 | −59.07 | 0.02155 | 0.02790 | 5.986 | 981 |
| 90,000 | −56.32 | 0.01707 | 0.02195 | 6.970 | 984 |
| 95,000 | −53.58 | 0.01354 | 0.01730 | 7.600 | 988 |
| 100,000 | −50.84 | d.01076 | 0.01365 | 8.559 | 991 |

\* × 0.3048 = meters.
† × (°F. − 32)/1.8 = °C.
‡ × 0.3048 = m/s.

The values given up to about 65,000 feet are designated as standard. The region from 65,000 to 105,000 feet is designated proposed standard. The assumed sea-level conditions are: pressure, $P_o$=29.91 inches (760 mm) of Hg=2, 116.22 lb/ft²; mass density $\rho_O$=0.002378 slugs/ft³ (0.001225 gm/cm³); $T_O$=59° F. (15° C.). These assumed sea level conditions define what is known as a "standard day."

At this point, it is useful to define the term "density altitude" ($H_d$). Density altitude is a convention by which air density is expressed in terms of the U.S. Standard Atmosphere altitude at which the corresponding air density is encountered. Referring to Table 1, when the actual air density outside the helicopter is 0.8617×sea level conditions, the density altitude, $H_d$, equals 5,000 feet, and when the actual air density is 0.7385×sea level density, the density altitude, $H_a$, equals 10,000 feet. It is important to note that as density altitude $H_d$ increases, air density is decreasing and when density altitude $H_d$ decreases, air density is increasing. Using relations developed from the Standard Atmosphere, air density expressed in terms of density altitude may be calculated using a term representing the pressure altitude $H_p$, i.e., the altitude based on pressure values such as obtained from an altimeter, and a term using outside air temperature (OAT). In general, density altitude $H_d$ corresponds to the pressure altitude $H_p$ on a standard day, i.e., a day on which actual conditions match those of the standard atmosphere. Subsequent references to "altitude" in this description should be interpreted to mean "density altitude" unless the specific context indicates otherwise.

When operating helicopters at high altitudes, the lower air density reduces the tail rotor authority available to control the helicopter. For this reason, many helicopters have a lower cross wind rating at high altitude than they do at low altitude. By increasing the maximum pitch of the tail rotor blades, the full rated authority of the tail rotor could be restored at higher altitudes. However, the drive assembly and helicopter airframe must be designed to take the stress produced by the maximum possible tail rotor authority. Thus, a design which would allow a tail rotor pitch at high altitudes that produced full tail rotor authority would have to be strong enough to withstand the stresses imposed when the same pitch was used at a lower altitude in more dense air. If this higher blade angle was available at all altitudes, this would require, at a minimum, extensive testing and requalification of the helicopter airframe and transmission system, and possibly the use of a much heavier design if the tail rotor forces are found to be excessive for the existing structure, the overstressing the tail rotor gear box, tail boom, or overtorquing this tail rotor drive train.

Restated, the need for this invention can be summarized as follows. When a helicopter is designed for low altitude use, its subsequent use at higher altitudes will result in less control because less tail rotor authority is available in the less dense air. Because of the reduced control at higher altitudes, restrictions may be imposed on the use of the helicopter, such as load limits or cross wind limits. Alternately, where a helicopter is designed to have adequate control at higher altitudes, it will be over-designed for use at low altitudes. This over-design may result in higher costs or in increased weight, which in turn would reduce the helicopter's useful load carrying capacity. In addition, a helicopter going from low altitude service to high altitude service cannot be simply converted because the addition of a conventional tail rotor producing greater thrust will require the requalification of the helicopter by the appropriate governmental regulatory authorities, typically an expensive and time-consuming task. The current invention addresses these problems in the following ways: It allows the helicopter to maintain maximum tail rotor force at all altitudes; there is little or no weight penalty associated with the use of the current invention; it preserves the flight characteristics, i.e., the control "feel" and control pedal travel distances; it eliminates the need to requalify the airframe or tail rotor transmission when a more powerful tail rotor is provided; and it provides the pilot with useful information regarding ambient air conditions.

The present invention allows a helicopter to take advantage of increased thrust produced by larger or more powerful tail rotor blades by varying the maximum tail rotor pitch angle in relation to density altitude. The maximum tail rotor pitch will be controlled by the invention to limit the maximum tail rotor thrust produced by the new blades to be equivalent of the current production tail rotor blade's operation at sea level. This will limit the thrust generated to the previously qualified values and will therefore generate no excessive tail boom load or tail rotor drive shaft torque values. By making the maximum tail rotor thrust variable, the current invention allows the tail rotor to be compensated for loss of effectiveness due to increasing density altitude.

Since it is common for helicopters to be employed in different activities during their useful lives, it is not uncommon to find a helicopter originally acquired for low altitude work which is subsequently pressed into high altitude work. A need exists for an apparatus which controls the maximum pitch of the tail rotor blades in relation to density altitude and which can be added or retrofitted to existing helicopters as well as being incorporated into new helicopter designs.

Since the piloting of a helicopter requires great skill and experience, a helicopter pilot typically becomes accustomed to the control "feel", i.e., the control motions and forces needed to pilot the helicopter in a given situation. Many pilots would find modifications to the helicopter unacceptable which significantly changed the control "feel." Thus, a need exists for an apparatus allowing variable maximum pitch of the tail rotor blades in relation to density altitude but which maintains the same control pedal travel.

Since the torque produced by the turning of the helicopter's main rotor typically acts in the same direction, the needs for tail rotor authority are not symmetrical. For example, on a helicopter whose main rotor blades turn counterclockwise when viewed from above, the air frame of such helicopter will always be subject to clockwise torque. This clockwise torque will assist yaw motions to the right while opposing yaw motions to the left. It is frequently desirable for such a helicopter to have considerably more left tail rotor authority than right tail rotor authority. In the example of the helicopter whose main rotor blades rotate counterclockwise, increased left thrust is desired at higher altitudes, but increased right thrust is not needed. A need exists for an apparatus allowing variable maximum pitch of the tail rotor blades in one direction in relation to density altitude, while the maximum pitch of the blades in the other direction remains essentially unchanged.

The advantages of the current invention are as follows: it allows the helicopter to maintain maximum tail rotor force at all altitudes; there is little or no weight penalty associated with the use of the current invention; it preserves the flight characteristics, i.e., the control "feel" and control pedal travel distances; it eliminates the need to requalify the airframe or tail rotor transmission when a more powerful tail rotor is installed; and it provides the pilot with useful information regarding ambient air conditions.

SUMMARY OF THE INVENTION

An object of the invention is to provide an apparatus allowing variable maximum pitch of the tail rotor blades in relation to density altitude. Another object is to produce an apparatus which can be used either on new helicopters or retrofitted to existing helicopters. A further object is to provide an apparatus which maintains the same control pedal travel for various maximum tail rotor pitches at various density altitudes. Yet another object of the invention is to provide an apparatus which varies the tail rotor blade angle in one direction in relation to density altitude, but which does not vary the maximum tail rotor blade angle in the other direction.

For use in a helicopter having a tail rotor control linkage connected to control pedals for changing the pitch of the tail rotor blades, a first embodiment of the invention comprises a linkage member having a variable geometry, an actuator connected to the linkage member and a control unit. The linkage member is connected between a first portion and a second portion of the tail rotor control linkage. This linkage member has a variable geometry having a range of configurations, and each configuration within the range corresponds to a different maximum pitch of the tail rotor blades. The actuator changes the configuration of the linkage member variable geometry in response to an actuator movement signal. The control unit provides actuator movement signals to the actuator in response to various inputs. Additional embodiments of the invention utilize different structures to provide inputs to the control unit including: manual switch settings, sensors such as pressure altitude sensors or outside air temperature sensors providing the control unit with signals corresponding to the ambient air conditions; and actuator position sensors providing the control unit with a signal corresponding to the actuator position. Additional embodiments comprise a display that receives the actuator position signal and provides a visual indication of the actuator position or a visual display that provides a status indication corresponding to a parameter of the apparatus.

In a preferred embodiment of the current invention, the linkage member of the apparatus further comprises a main lever and a secondary lever. The main lever has a main pivot point, a first linkage connection point, a secondary lever connection point, and a first actuator connection point. The main pivot point is pivotally connected to a fixed portion of the helicopter, the first linkage connection point is connected to the first portion of the tail rotor control linkage, and the first actuator connection point is connected to a first portion of the actuator. The secondary lever has a main lever connection point, a second linkage connection point, and a second actuator connection point. The main lever connection point is pivotally connected to the second lever connection point of the main lever, the secondary linkage connection point is connected to the second portion of the tail rotor control linkage, and the second actuator connection point is connected to a second portion of the actuator. Relative movement between the first and second portions of the actuator will vary a distance between the main pivot point and the second linkage connection point, varying the moment arm of the linkage member and thereby varying the maximum pitch of the tail rotor blades without varying the travel of the control pedals.

In a more preferred embodiment of the current invention, the linkage member and the tail rotor control linkage are dimensioned such that when the control pedals are at a maximum travel in a first direction, movement of the actuator through its full range of positions will produce no appreciable rotation of the linkage member and thus no appreciable variation of the maximum pitch of the tail rotor blade in the first direction. The linkage member and tail rotor control linkage are further dimensioned such that when the control pedals are at maximum travel in the opposite direction, movement of the actuator through its full range of positions, from a first position corresponding to the lowest density altitude and the lowest maximum pitch of the tail rotor blades, to a second position corresponding to the highest density altitude and the highest maximum pitch of the tail rotor blades, will produce a rotation of the linkage member and movement of the tail rotor control linkage such that the pitch of the tail rotor blades in the opposite direction will vary from a lowest maximum pitch to a highest maximum pitch.

Additional embodiments provide alternative configurations of the variable geometry linkage member.

In yet another embodiment, an apparatus is provide which does not use a variable geometry linkage member. In this embodiment, the apparatus comprises a stop member having a variable position, an actuator connected to the stop member, and a control unit. The stop member has a variable position within a range of positions and is located proximate to, and in the first direction relative to, a movable link of the tail rotor control linkage. The stop member blocks further movement of the link in the first direction. The actuator is connected to the stop member for selectively changing the variable position in response to an actuator position command. The control unit provides an actuator position command to the actuator in response to various inputs.

In a most preferred embodiment, the apparatus further comprises an actuator position sensing device, a pressure altitude sensing device, an outside air temperature sensing device, and the control unit comprises a microcontroller. The sensing devices are all connected to the control unit and provide signals corresponding to the parameter sensed by the device. The microcontroller monitors the pressure altitude signal, the outside air temperature signal, and the actuator position signal, it determines a density altitude value corresponding to the pressure altitude signal and outside air temperature signal, it determines a desired actuator position corresponding to a desired maximum pitch of tail rotor blades for the calculated density altitude value, it compares the desired actuator position to the actuator position signal and determines a position error value corresponding to that difference, and it conditionally provides an actuator movement signal to the actuator in response to the position error value, thereby varying the maximum pitch of the tail rotor blades in relation to ambient air conditions.

In further most preferred embodiments, the microcontroller of the control unit determines the density altitude value by using the exact "standard atmosphere" equation, or by using an approximation of the "standard atmosphere" equation.

Other objects, features and advantages of the invention will be apparent from the following detailed description taken in connection with the accompanying drawings.

BRIEF DESCRIPTION OF THE DRAWINGS

For a more complete understanding of the present invention, reference is now made to the following description, taken in conjunction with the accompanying drawings, in which like reference numerals identify like elements in the figures and in which:

FIG. 2a is an enlarged illustrative view of the apparatus of the current invention shown in FIG. 1;

FIG. 2b is a partial view of the apparatus of the current invention showing a control unit having a manual switch;

FIG. 2c is another partial view showing a control unit connected to ambient air condition sensors;

FIG. 2d is another partial view showing a control unit and also showing a display for indicating the actuator position;

FIG. 2e is another partial view showing a control unit having a visual display to provide indications of system parameters;

FIG. 2f is another partial view showing a control unit having an electrical-pneumatic sensor for ambient air conditions;

FIG. 3 is a side view of the linkage member shown in FIGS. 1 and 2a;

FIG. 4 is a side view of an alternate embodiment of the linkage member shown in FIGS. 1 and 2a;

FIG. 7a is an enlarged illustrative view of the apparatus shown in FIG. 6;

FIG. 7b is a partial view of an alternative embodiment of the apparatus in FIGS. 6 and 7a;

FIG. 7c is a partial view of another alternative embodiment of the apparatus in FIGS. 6 and 7a;

FIGS. 13a, 13b and 13c are block diagrams of the Modes Module shown in FIG. 10;

FIGS. 16a, 16b and 16c are illustrative views of a tail rotor profile showing pitch angles;

FIGS. 17a and 17b are illustrative views of a tail rotor profile showing angle of attack.

DETAILED DESCRIPTION

Figure 15:
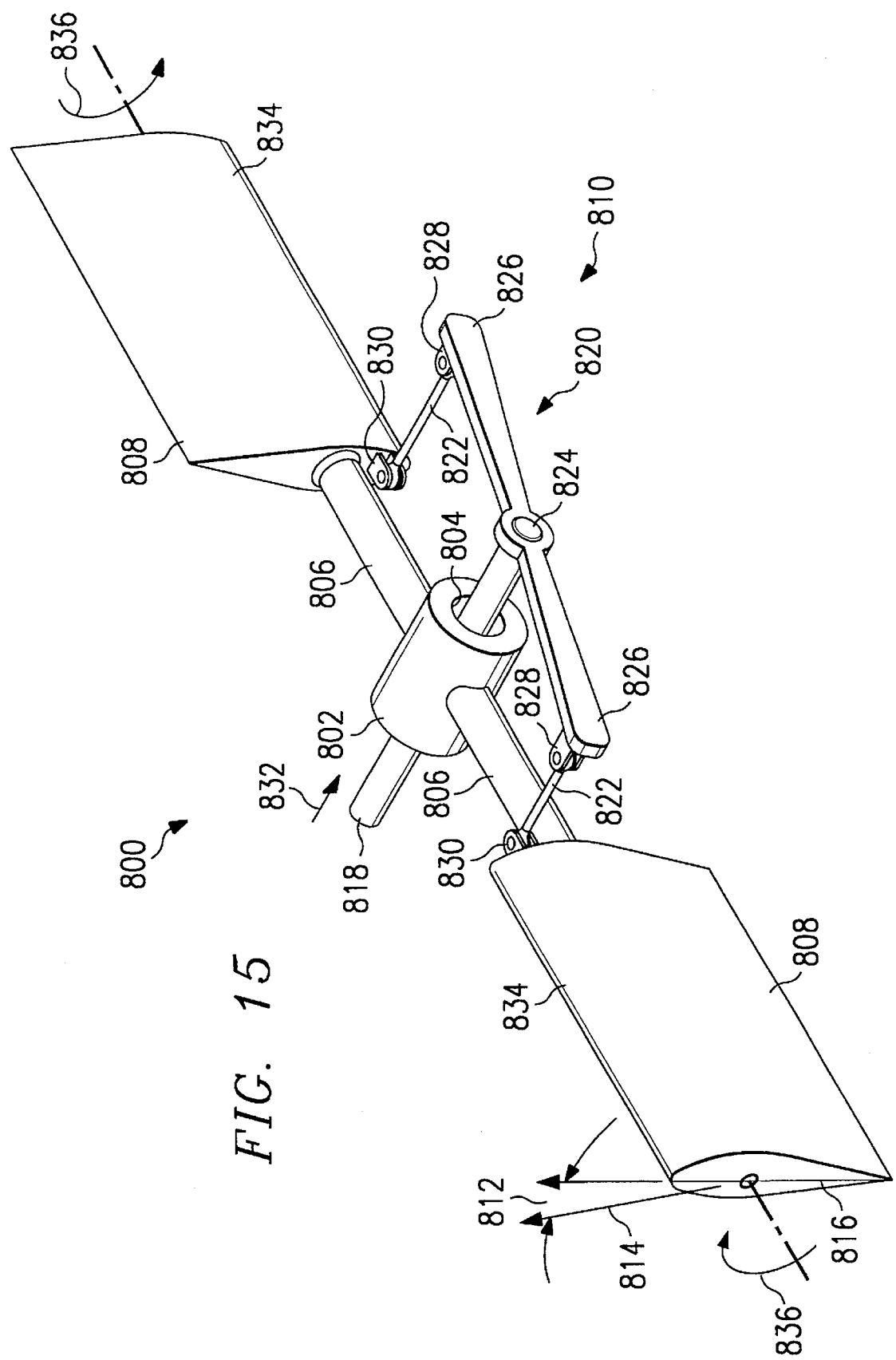
FIG. 15 is a perspective view of a helicopter tail rotor and pitch control mechanism.

Referring now to the drawings, wherein like reference numerals designate like or corresponding parts throughout the several views, and in particular to FIG. 15, a typical tail rotor assembly 800 is shown. Tail rotor assembly 800 comprises a hub 802 provided with a cylindrical opening 804 therethrough, a plurality of blade supports 806, a like number of tail rotor blades 808, and a pitch control mechanism 810. Blade supports 806 extend radially from hub 802. Tail rotor blades 808 are pivotally mounted on blade supports 806 such that the angle 812 between the direction of rotation 814 and the chord line 816 of tail rotor blade 808 can be varied. Pitch control mechanism 810 comprises a pitch control shaft 818, a T-bar 820 and pitch control links 822. Pitch control shaft 818 passes through cylindrical opening 804 in hub 802. The center 824 of T-bar 820 is attached to pitch control shaft 818, and the ends 826 are attached to first ends 828 of pitch control links 822. Second ends 830 of pitch control links 822 are connected to tail rotor blades 808 at leading edges 834. Lateral movement 832 of pitch control shaft 818 is transmitted via the T-bar 820 and pitch control links 822 to the leading edge 834 of the tail rotor blades 808, causing a pitch change in the direction shown by arrows 836. Similarly, movement of the pitch control shaft 818 in the opposite direction will cause the rotor blade pitch to change in the opposite direction.

Referring now to FIGS. 16a, 16b and 16c, the concept of tail rotor pitch can be described. Tail rotor profile 840 is a lateral cross-section of the tail rotor blade. Profile 840 has a leading edge 842, a trailing edge 844 and a cord line 846 connecting leading and trailing edges 842 and 844. Rotation vector 848 indicates the direction and velocity of the rotation of blade profile 840. Pitch angle 850a, 850b and 850c is defined as the angle formed between the rotation vector 848 and the cord line 846 of blade profile 840. Referring to FIG. 16b, blade profile 840b has a pitch angle 850b equal to zero because the rotation vector 848 is coincident with the cord line 846 of blade profile 840b. Assuming no cross wind components, the flow of air (not shown) around blade profile 840b as it rotates will produce a sideways force 852b. Referring now to FIG. 16a, blade profile 840a has a pitch angle 850a<0, i.e., a negative pitch angle, because blade profile 840a is rotated such that upper side 854 is presented to the oncoming air flow. Referring now to FIGS. 16a and 16b, side force 852a produced by the flow of air (not shown) around blade profile 840a having a negative pitch angle 850a, will be lower than side force 852b produced by the flow of air (not shown) around blade profile 840b having pitch angle 850b equal to zero. Referring now to FIG. 16c, blade profile 840c has a pitch angle 850c>0 because blade profile 840c is rotated such that lower surface 856 is presented to the oncoming air flow. Side force 852c produced by the flow of air (not shown) around blade profile 840c having a positive pitch angle 850c will be greater than side force 852b caused by the flow of air around blade profile 840b having angle of attack 850b equal to zero. A helicopter pilot uses the control pedals to selectively vary the pitch of the tail rotor blades and thereby produce the tail rotor side thrust that is appropriate for a particular circumstance.

Referring now to FIGS. 17a and 17b, the concept of angle of attack can be described and differentiated from that of angle of pitch. Blade profiles 860a and 860b are identical, each having, respectively, identical cord lines 862a and 862b, rotation vectors 864a and 864b and pitch angles 866a and 866b. For both blade profiles 860a and 860b, rotation vectors 864a and 864b will respectively produce a first component vector 868a and 868b of the "relative wind", i.e., the direction at which air approaches the rotating tail rotor blade. In each case, first component vector 868a and 868b will have an equal magnitude but opposite direction to rotation vector 864a and 864b. Referring now to FIG. 17a, there are no cross winds or other lateral air speed components, thus the resultant vector 870a of relative wind for blade profile 860a is identical to the first component vector 868a produced by rotation. The angle of attack for a tail rotor blade is the angle formed between the chord line and the resultant vector of the relative wind. In FIG. 17a, angle of attack 872 is the angle formed between chord line 862a and resultant vector 870a of the relative wind. Since there are no cross winds or other lateral air speed components, the angle of attack 872 is equal to the pitch angle 866a. Air flow around blade profile 860a will produce a side thrust 874.

Referring now to FIG. 17b, the cross wind vector 874 is introduced into the situation. When cross wind vector 874 is added to first component vector 868b, caused by the rotation of blade profile 860b, resultant vector 870b may be obtained. The angle formed between chord line 862b of blade profile 860b and resultant vector 870b yields the angle of attack 876 for blade profile 860b in the presence of cross wind 874. Referring again to FIGS. 17a and 17b, it can be seen that the presence of cross wind 874 results in a smaller angle of attack 876 for blade profile 860b than angle of attack 872 for blade profile 870a, which has no cross wind, even though the rotation vectors 864a and 864b and pitch angles 866a and 866b are identical. Because of the smaller angle of attack 876, the flow of air around profile 860b will produce a smaller side thrust 878 than side thrust 874 produced for blade profile 860a in the absence of cross wind.

Figure 1:
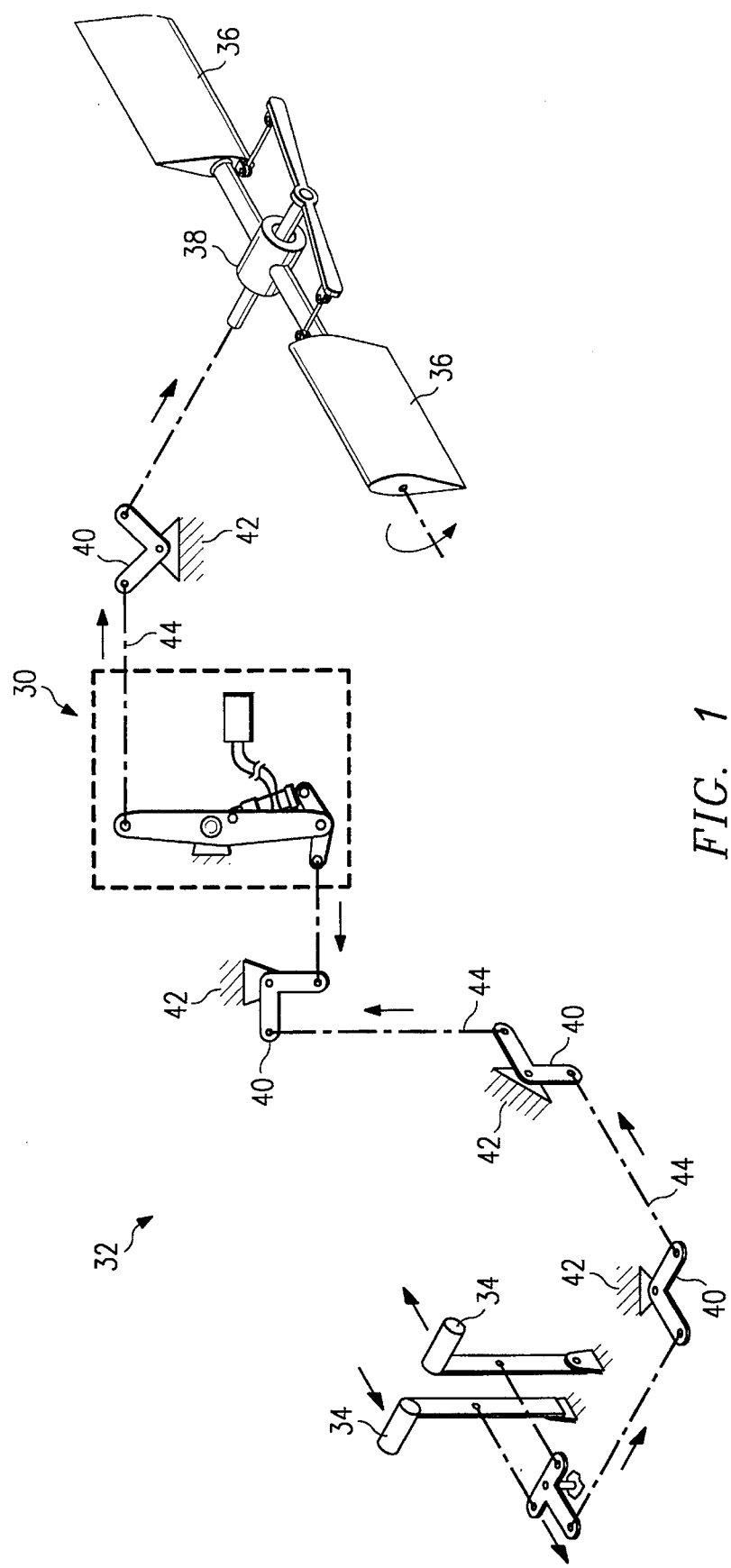
FIG. 1 is a perspective view showing a tail rotor control linkage connected to control pedals for changing the pitch of the tail rotor blades.

Referring now to FIG. 1, an apparatus 30 of the current invention is shown as part of the tail rotor control linkage 32 of a helicopter. Control linkage 32 is connected to control pedals 34 for changing the pitch of the tail rotor blades 36 which are pivotally connected to tail rotor hub 38. Tail rotor control linkage 32 typically comprises a series of bell cranks 40 mounted on fixed portions 42 of the helicopter with push/pull tubes 44 installed therebetween. One skilled in the art will appreciate, however, that tail rotor control linkage 32 may also comprise cables and pulleys, hydraulic lines and actuators, and other standard aircraft control mechanisms, without departing from the spirit of this invention. Furthermore, the location of the apparatus 30 within the tail rotor control linkage 32 is not critical, rather the apparatus may be located based on a designer's evaluation of numerous considerations including available space, accessibility, weight and center of gravity limitations, and costs.

FIG. 2a shows apparatus 30 with only a portion of the tail rotor control linkage. Linkage member 46 is connected to a first portion 48 and a second portion 50 of the tail rotor control linkage. Linkage member 46 has a variable geometry having a range 52 of configurations. An actuator 54 is connected to linkage member 46. Actuator 54 changes the configuration of linkage member 46 in response to an actuator movement signal 58. Two such configurations for linkage member 46 are shown. In the first configuration, second portion 50 of the tail rotor control linkage is shown in solid, while in the second configuration, second portion 50' is shown in phantom. Control unit 56 provides actuator 54 with actuator movement signals 58 in response to inputs 60. In some embodiments, an actuator position sensor 62 is located proximate to actuator 54. Actuator position sensor 62 detects the position of actuator 54 and provides control unit 56 an actuator position signal 64 corresponding to the position of actuator 54.

Numerous types of inputs 60 may be received by control unit 56. In FIG. 2b, control unit 56 receives inputs comprising manual switch settings 66 chosen by the pilot. In FIG. 2c, control unit 56 is connected to sensors 68 for detecting ambient air conditions. Sensors 68 may comprise a pressure altitude sensor 70 providing control unit 56 with pressure altitude signals 72. Sensor 68 may also comprise an outside air temperature sensor 74 providing control unit 56 with outside air temperature signals 76. In FIG. 2d, a first visual display 78 receives actuator position signal 64 and provides a visual indication of the position of actuator 54 (not shown) and the configuration of linking member 46 (not shown). In FIG. 2e, control unit 56 is equipped with a second visual display 80 for providing a status indication of selected parameters, such as air temperature, density altitude, actuator position, and maximum pitch angle. Those skilled in the art will appreciate that control unit 56 may utilize many types of manual and sensor-based inputs and many types and configurations of visual displays, without departing from the spirit of this invention. For example, referring to FIG. 2f, control unit 56 is shown having an electrical-pneumatic sensor 55 for detecting ambient air conditions such as pressure. Sensor 55 comprises a pneumatic bellows 57 having a first end 59 that is fixed, and a second end 61 that is connected to a variable resistor 63. Changing air pressure will cause pneumatic bellows 57 to expand or contract, thereby changing the resistivity of variable resistor 63, and thereby producing an electrical signal corresponding to an ambient air condition. One skilled in the art will also appreciate that control unit 56 may be placed at many locations within the helicopter and that first and second visual displays 78 and 80 may also be placed at any location within the helicopter, with such location not necessarily being proximate to control unit 56.

Figure 3:
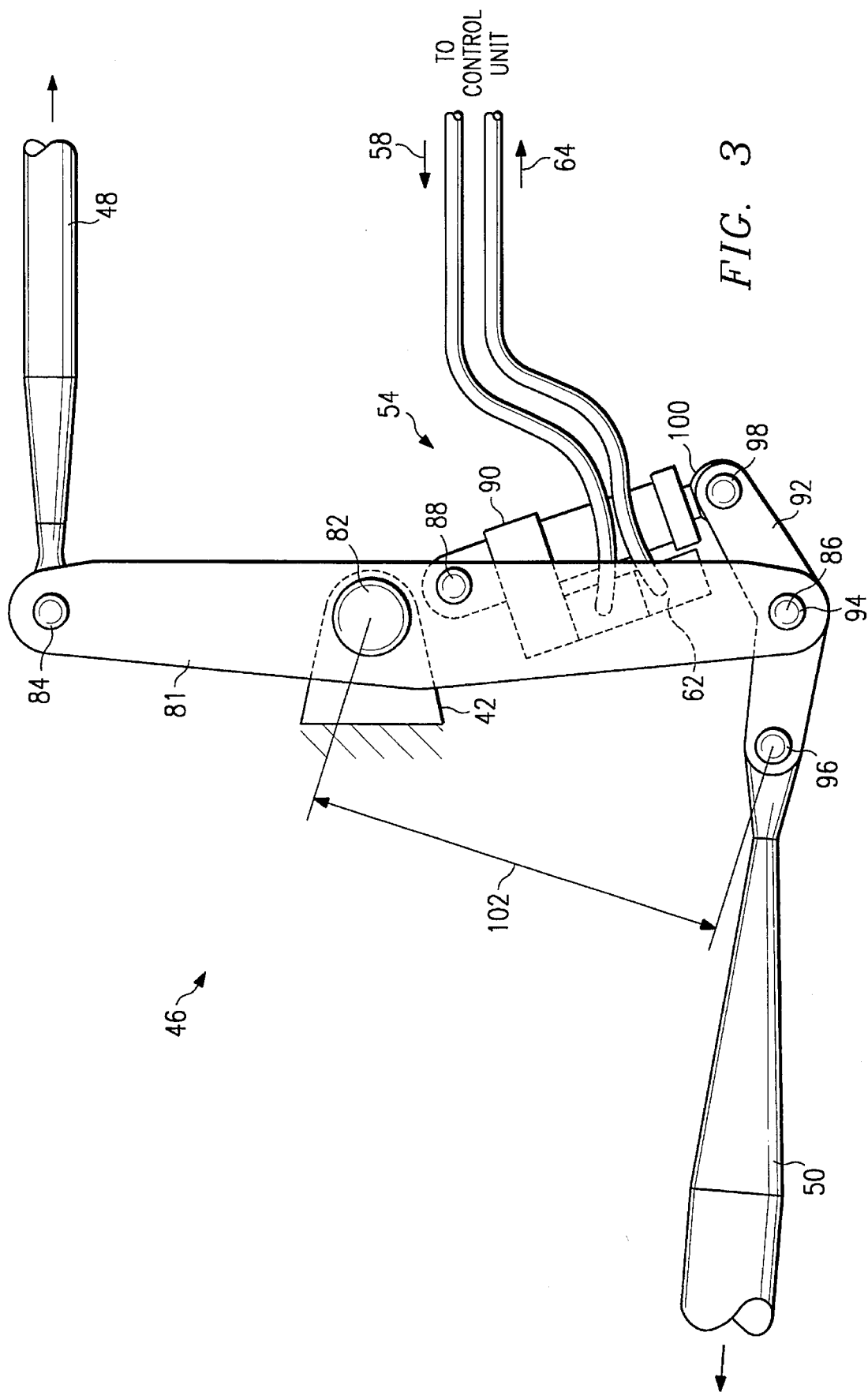

Referring to FIG. 3, linkage member 46 is shown in greater detail. Linkage member 46 comprises a main lever 81 having a main pivot point 82, a first linkage connection point 84, a secondary lever connection point 86, and a first actuator connection point 88. Main pivot point 82 is pivotally connected to a fixed portion 42 of the helicopter. First linkage connection point 84 is connected to the first portion 48 of the tail rotor control linkage. First actuator connection point 88 is connected to a first portion 90 of the actuator 54. Linkage member 46 further comprises a secondary lever 92 having a main lever connecting point 94, a second linkage connection point 96 and a second actuator connection point 98. Main lever connection point 94 is pivotally connected to secondary lever connection point 86 of main lever 81. In the illustrated embodiment, main lever connection point 94 and secondary lever connection point 86 comprise passageways having a pin inserted therethrough, however, the exact nature of the connection is not critical. Second linkage connection point 96 is connected to second portion 50 of the tail rotor control linkage. Second actuator connection point 98 is connected to a second portion 100 of actuator 54. Relative motion between first portion 90 and second portion 100 of the actuator will vary a distance 102 between main pivot point 82 and second linkage connection point 96. Changing distance 102 changes the moment arm of linkage member 46 thus affecting the relative travel between first portion 48 and second portion 50 of the tail rotor control linkage. Varying this relative motion will thereby vary the maximum pitch of tail rotor blades without varying the travel of the control pedals. Actuator position sensor 62 may be mounted proximate to actuator 54 to sense the position of actuator 54 and provide actuator position signals 64 to the control unit (not shown).

Figure 4:
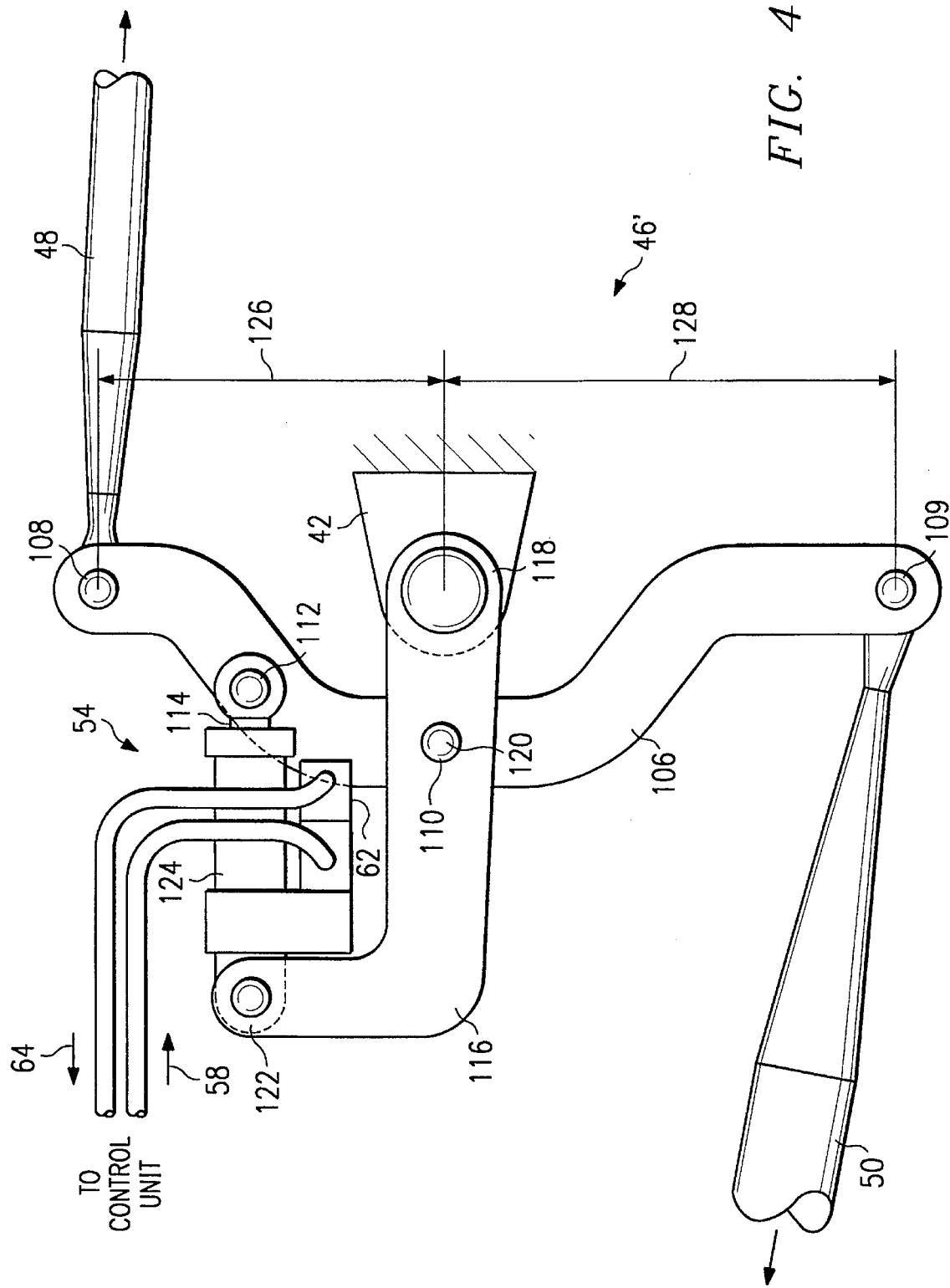

Those skilled in the art will appreciate that numerous configurations of the linkage member are possible. An alternative embodiment is shown in FIG. 4. Alternative linkage member 46' comprises a main lever 106 having first and second linkage connection points 108 and 109, a secondary lever connection point 110 and a first actuator connection point 112. First linkage connection point 108 is connected to a first portion 48 of the tail rotor control linkage. Second linkage connection point 109 is connected to a second portion 50 of the tail rotor control linkage. First actuator connection point 112 is connected to a first portion 114 of actuator 54. Secondary lever 116 has a main pivot point 118, a main lever connection point 120 and a second actuator connection point 122. Main pivot point 118 is pivotally connected to a fixed portion 42 of the helicopter. Main lever connection point 120 is pivotally connected to main lever 106 at secondary lever connection point 110. In the current embodiment, connection points 120 and 110 comprise passageways having a pin therethrough, however, the exact nature of the connection is not critical. Second actuator connection point 122 is connected to a second portion 124 of actuator 54. Relative motion between first and second portions 114 and 124 of actuator 54 will vary a first distance 126 between main pivot point 118 and first linkage connection point 108 and will vary a second distance 128 between main pivot point 118 and second linkage connection point 109. In this manner, the moment arms of alternate linkage member 46' will be changed thus varying the relative ratio between the first and second portions 48 and 50 of the tail rotor control linkage and thereby varying the maximum pitch of the tail rotor blades without varying travel of the control pedals.

Figure 5:
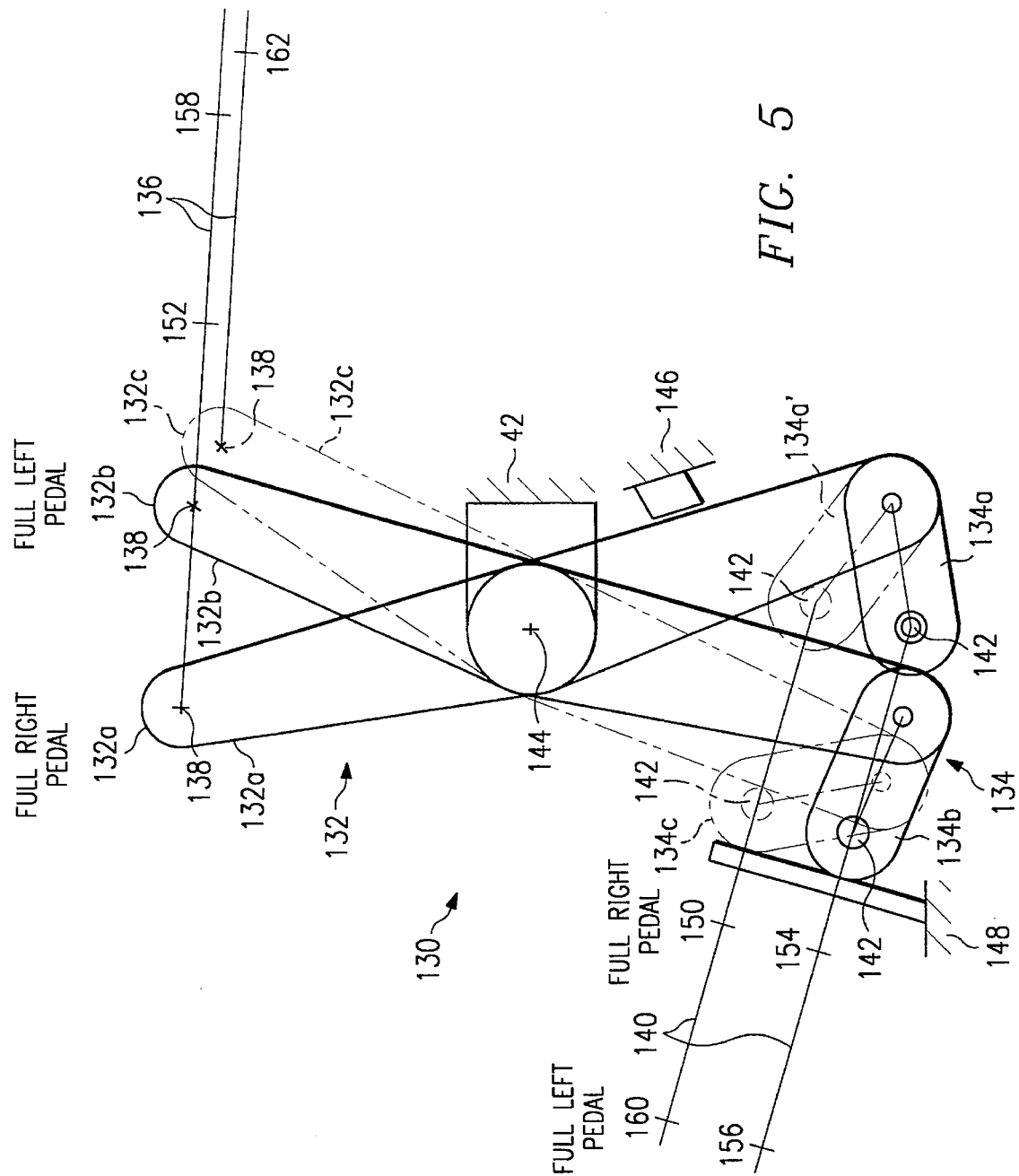
FIG. 5 is an illustrative view of a portion of the linkage member shown in FIG. 3 indicating how dimensions can be chosen such that the maximum tail rotor blade angle can be varied in one direction while the maximum tail rotor blade angle in the other direction remains constant.

In a preferred embodiment similar to that shown in FIG. 3, the apparatus will vary the maximum pitch of the tail rotor blades in a first direction as a function of ambient air condition when the control pedals are at a maximum travel in the first direction, while the maximum pitch of tail rotor blades in a second direction will not vary as a function of ambient air conditions when the control pedals are at a maximum travel in the second direction. Referring to FIG. 5, linkage member 130 comprises a main lever 132 and a secondary lever 134. The actuator and some portions of the secondary lever are not shown for clarity. Instead, secondary lever 134 is shown in configurations 134a and 134b corresponding to high air density that would be encountered at low altitudes. Secondary lever 134 is also shown in configurations 134a' and 134c (shown in phantom) corresponding to actuator settings for low air densities that would be encountered at high altitude. A first portion 136 of the tail rotor control linkage is connected to main lever 132 at first connection point 138. First portion 136 leads to the tail rotor control mechanism, therefore variations in the movement of first portion 136 will result in variations of the tail rotor blade pitch. A second portion 140 of the tail rotor control linkage is connected to the secondary lever 134 at second connection point 142. Second portion 140 leads to the control pedals of the helicopter and movement of the control pedals will cause corresponding movement in second portion 140. Linkage member 130 has a main pivot point 144 which is pivotally attached to a fixed portion 42 of the helicopter. The rotational motion of main lever 132 is constrained by the first and second stop 146 and 148. First stop 146 constrains the motion of main lever 132 when moved to the full right pedal position 132a. Second stop 148 constrains the motion of secondary lever 134 when the control pedals are moved to the full left pedal position. Note that it is not necessary for stops 146 and 148 to be located proximate to the linkage member. These stops can be located at any point of the linkage where the same function is obtained. When secondary lever 134 is blocked by second stop 148, the position of main lever 132 is dependent upon the relative position of secondary lever 134. For example, secondary lever 134b is in a position corresponding to full left pedal and highest air density. This causes main lever 132 to assume the position shown by main lever 132b. Similarly, secondary lever 134c is in a position corresponding to full left pedal and lowest air density causing main lever 132 to assume the position shown at 132c (shown in phantom). Such an embodiment of the current invention allows the maximum pitch of the tail rotor blades in the left direction to vary as a function of ambient air conditions, while the maximum pitch of the tail rotor blades does not vary in the right direction. Still referring to FIG. 5, operation of the properly dimensioned linkage member can be explained: for example, reference mark 150 indicates the position of second portion 140 of the tail rotor control linkage when the control pedals are at a maximum travel in the right direction and the actuator has positioned secondary lever 134 in the high altitude position indicated by secondary lever 134a' (shown in phantom). This positions main lever 132 in the position shown at main lever 132a. A reference mark 152 on first portion 136 of the tail rotor control linkage represents the position of first portion 136 corresponding to second portion position 134a'. If, while maintaining full pedal travel in the right direction, secondary lever 134 is moved to position 134a corresponding to the low altitude position, second portion 140 of the tail rotor control linkage will be displaced laterally such that reference mark 150 will move to the position of reference mark 154. Note that when second portion 140 is of sufficient length, the movement of secondary lever 134 from the position shown at 134a' to the position 134a causes essentially only a lateral displacement of second portion 140 of the tail rotor control linkage from reference mark 150 to reference mark 154, without producing any appreciable rotation of main lever 132 from its original position shown in position 132a. Thus, reference mark 152 on first portion 136 of the tail rotor control linkage will remain in the same position regardless of whether secondary lever 134 is in position 134a, 134a' or any position therebetween. When the control pedals are moved from full travel in a right direction to full travel in the left direction and with secondary lever 134 in the lowest altitude setting as shown by secondary lever 134b, then reference mark 150 on the second portion 140 of the tail rotor control linkage will move to the position of reference mark 156. This corresponds to a position of main link 132 shown by main link 132b, which in turn causes reference mark 152 on the first portion 136 of the tail rotor control linkage to move from reference mark 152 to the position of reference mark 158. The difference in position between reference mark 152 and reference mark 158 represents the distance required for the tail rotor actuator mechanism to change the pitch of the tail rotor blades from a maximum pitch in the first direction for the lowest altitude to a maximum pitch in the opposite direction for the lowest altitude. Movement of secondary arm 134 from the low altitude setting 134b to the high altitude setting 134c (shown in phantom) would again cause a movement of second portion 140 of the tail rotor control linkage from the position shown by reference marks 154 and 156 to the position indicated by reference marks 150 and 160. Note that because of the position of second stop 148, second portion 140 has the same total control pedal travel whether traveling from reference mark 154 to reference mark 156 when actuator 134 is in the low altitude setting or traveling from reference mark 150 to reference mark 160 when secondary lever 134 is in the high altitude setting. When secondary lever 134 is in the high altitude setting, application of full left control pedal and the corresponding movement of second portion 140 of tail rotor control linkage to reference point 160 will result in main lever 132 moving to the position shown at main lever 132c (shown in phantom). This will cause the reference point on the first portion 136 of the tail rotor control linkage which was previously positioned as shown at reference marks 152 and 158 to now move to reference mark 162. Thus, when secondary lever 134 is in the low altitude setting shown by 134a and 134b, and the control pedals cause the first portion 140 of the tail rotor control linkage to move from reference point 154 to reference point 156, first portion 136 of the tail rotor control linkage will move from reference point 152 to reference point 158. When secondary lever 134 is in the high altitude position shown by 134a' and 134c (shown in phantom), second portion 140 of the tail rotor control linkage will move from reference point 150 to 160. This is the same distance as between reference points 154 and 156, indicating that the total control pedal travel has not changed. Movement of second portion 140 of the tail rotor control linkage between reference points 150 and 160 will cause a corresponding movement of the first portion 136 of the tail rotor control linkage from reference marks 152 to reference marks 162. The distance between reference marks 152 and 162 is greater than the distance between reference marks 152 and 158. This increased distance results in increased travel at the tail rotor control mechanism and correspondingly, a maximum pitch for the tail rotor blades in the left direction which can be varied as a function of air conditions, while the maximum pitch of the tail rotor blades in the right direction does not vary in response to the motion of secondary lever 134a as it responds to changes in ambient air conditions.

Those skilled in the art will appreciate that many different configurations of linkage member 130 and arrangement of first and second stops 146 and 148 are within the scope of this invention. In addition, it will be readily apparent how the previous examples which allowed the maximum pitch of the tail rotor blades in the left direction to vary as a function of altitude while the maximum blade pitch in the right direction remain constant regardless of altitude, can be adapted such that the maximum pitch of the tail rotor blades in the right direction can vary as a function of altitude while the maximum pitch of the tail rotor blades in the left direction remains constant regardless of altitude.

Figure 6:
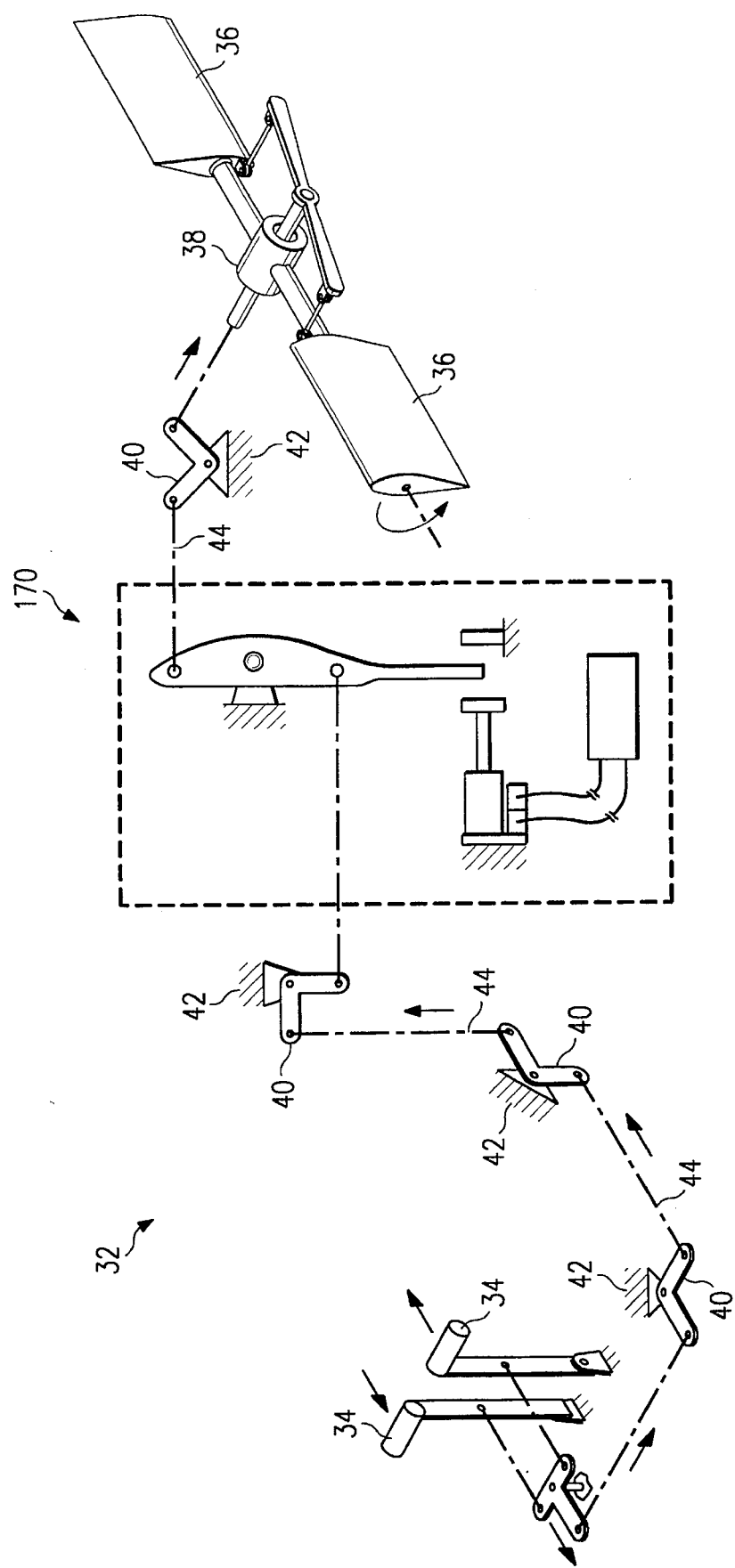
FIG. 6 is a perspective view of the tail rotor control linkage connected to control pedals for changing pitch of the tail rotor blades equipped with an alternative embodiment of the current invention.

Referring to FIG. 6, an alternative apparatus 170 is shown incorporated into the tail rotor control linkage of a helicopter. As with the previous embodiment, those skilled in the art will appreciate that the apparatus may be installed at a variety of locations within the helicopter based on considerations of available space, accessibility, weight and center of gravity. Referring to FIG. 7a, a link 172 of the tail rotor control system has a main pivot point 174 and first and second link connection points 176 and 178. Main pivot point 174 is pivotally mounted to a fixed portion 42 of the helicopter and first and second link connection points 176 and 178 are connected to first and second portions 48 and 50 of the tail rotor control linkage. Alternative apparatus 170 further comprises a first stop member 180, an actuator 182 and a control unit 184. First stop member 180 has a variable position within a range 186 of positions. Stop member 180 is located proximate to and in a first direction 188 from link 172. First stop member 180 blocks further movement of movable link 172 in direction 188, thereby limiting the maximum pitch of the tail rotor blades when the control pedals are at maximum travel in the corresponding direction. Actuator 182 is connected to first stop member 180 to selectively change the variable position throughout range 186 of positions. In FIG. 7a, stop member 180 is shown having a range 186 of positions from a first position 180a to a second position 180b (shown in phantom). By varying the position of stop member 180, the maximum movement of the movable link 172 in the first direction 188 can also be varied, thereby varying the maximum pitch of the tail rotor blades corresponding to maximum travel of the control pedals in the first direction 188. Actuator 182 changes the variable position of stop member 180 in response to actuator position commands 190. Control unit 184 provides actuator position commands 190 to actuator 182 in response to inputs 192. In a preferred embodiment, actuator 182 is equipped with an actuator position sensor 194 which provides actuator position signals 196 to control unit 184. Those skilled in the art will appreciate that numerous configurations of movable link 172, stop member 180, and actuator 182 are possible in keeping with the teachings of this invention. Optionally, a second stop 181, which may be fixed or movable, can be utilized if he circumstances warrant. Referring to FIG. 7b, a first alternative embodiment having movable link 172', stop member 180', and actuator 182' is shown. FIG. 7c shows yet another embodiment having movable link 172", stop member 180", and actuator 182".

Alternative apparatus 170 incorporating stop member 180 has several advantages over alternative apparatus for varying the maximum pitch of the tail rotor blades. In many circumstances, it would be possible to position stop 180 and actuator 182 such that the apparatus can limit the travel of an existing movable link 170 in the tail rotor control linkage, obviating the necessity to replace or redesign an existing link. Where an existing link is used, this embodiment has an additional advantage in that only a stop member, actuator, and control unit need be added to the helicopter to have a functioning apparatus, which may result in both cost and weight savings.

As previously discussed, control units 56 may utilize a variety of inputs to control the maximum pitch of the tail rotor blades as a function of ambient air conditions. These inputs may range from manual switch settings made by the pilot or another user, to fully automatic control units utilizing external air condition sensors and electronic circuitry, whether formed of discrete components or a microcontroller or microprocessor. Automatic control of the maximum pitch of the tail rotor blades is preferred, because it allows more accurate readings of the ambient air conditions and does not impose additional responsibilities on the pilot of the helicopter.

Figure 8:
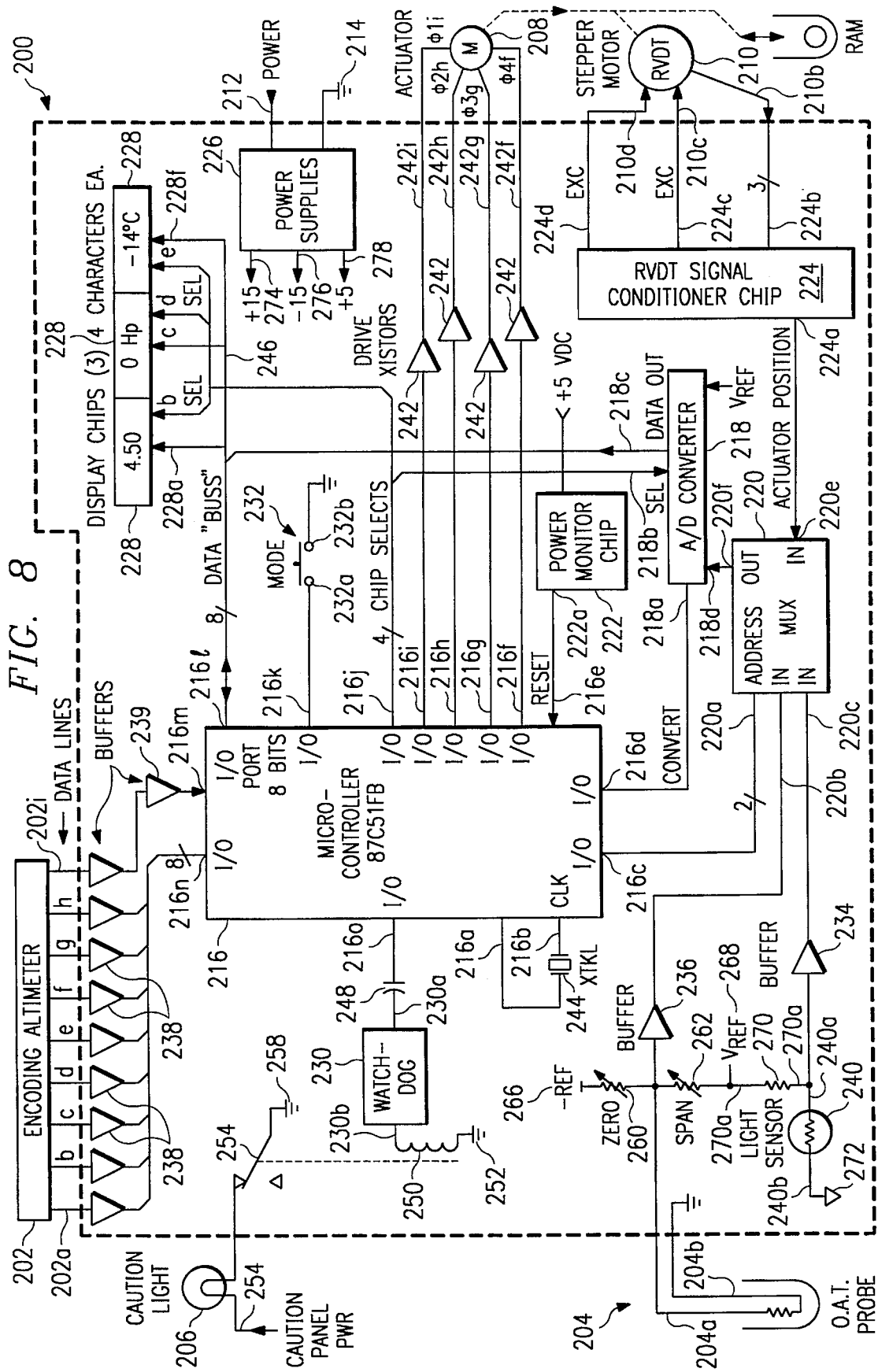
FIG. 8 is a block diagram schematic of a preferred embodiment of the invention including a control unit having a microcontroller, ambient air condition sensors, an actuator position sensor and a visual display.

A preferred embodiment of the control unit is shown in FIG. 8. Control unit 200 is shown connected to some of the peripheral devices making up a maximum tail rotor pitch control apparatus including: an encoding altimeter 202, an outside air temperature probe 204, a caution light 206, an actuator 208, an actuation position sensor 210, a power source 212, and ground 214. Control unit 200 comprises a microcontroller 216, an analog-to-digital converter 218, a multiplexer 220, a power monitor 222, an actuator position signal conditioner 224, power supplies 226, display units 228, a watch-dog circuit 230, a mode select switch 232, first, second, third and fourth buffers 234, 236, 238, and 239 respectively, light sensor 240 and drive transistors 242. In the preferred embodiment, microcontroller 216 is an Intel 87C51FB 8 bit microcontroller. This microcontroller integrates a read only memory (ROM), a type of data program storage device, with a central processing unit (CPU). Those skilled in the art will appreciate that this ROM could be either internal or external to the microcontroller. However, those skilled in the art will appreciate that numerous other microcontrollers and microprocessors can be used. A crystal 244 is connected to pins 216a and 216b on microcontroller 216. Pins 216c of microcontroller 216 are connected to pins 220a on multiplexer 220 for the transfer of address information. Pins 216d on microcontroller 216 are connected to pins 218a on analog to digital converter 218 for the transfer of digital signals to microcontroller 216. Pin 216e on microcontroller 216 is connected to pin 220a on power monitor 222 for transferring reset signals to microcontroller 216. Pins 216f, g, h, and i on microcontroller 216 are connected to drive transistors 242f, g, h, and i respectively for the transfer of actuator commands. Pins 216j of microcontroller 216 are connected to pins 218b on analog-to-digital converter 218 and pins 228b, d and e on display units 228 for the transfer of selection data. Pin 216k on microcontroller 216 is connected to a first terminal 232a on mode select switch 232. Second terminal 232b on mode select switch 232 is connected to a reference level such that operation of mode select switch 232 will selectively bring pin 216k to the reference level to provide mode select inputs. Pin 216l on microcontroller 216 are connected via data buss 246 to pins 218c on analog to digital convertor 218 and pins 228a, c and f on display units 228 for the transfer of data. Pins 216m on microcontroller 216 are connected via buffers 239 and 238i to encoding altimeter 202 for the transfer of altitude data. Pins 216n on microcontroller 216 is connected via buffers 238a, b, c, d, e, f, g, and h to pins 202a, b, c, d, e, f, g, and h respectively on encoding altimeter 202 for the transfer of altitude data. Pin 216o on microcontroller 216 is connected via capacitor 248 to pin 230a of watch dog circuit 230. Pin 230b of watch dog circuit 230 is connected via coil 250 to a reference level 252. In response to signals received from microcontroller 216, watch dog circuit 230 selectively energizes or de-energizes coil 250 such that switch 254 is selectively opened or closed. When watch dog circuit 230 receives signals (or lack thereof) from microcontroller 216 indicating a malfunction in the system, switch 254 is caused to operate such that electric power can flow from caution panel power 254 via caution light 206 and switch 254 to reference level 258 causing light 206 to indicate a possible system malfunction. Pin 220*b* on multiplexer 220 is connected via buffer 236 to an adjustable "zero" resistor 260, an adjustable "span" resistor 262 and to lead 204*a* on outside air temperature probe 204. Lead 204*b* of outside air temperature probe 204 is connected to reference level 264. "Zero" resistor 260 is also connected to negative reference level 266. "Span" resistor 262 is connected to reference voltage 268 and a first lead 270*a* of resistor 270. Pin 220*c* of multiplexer 220 is connected via buffer 234 to a second lead 270*b* of resistor 270 and to a first lead 240*a* of light sensor 240. Second lead 240*b* of light sensor 240 is connected to reference level 272. Pin 220*e* of multiplexer 220 is connected to pin 224*a* of actuator position signal conditioner 224 for the transfer of actuator position signals. Pin 220*f* of multiplexer 220 is connected to pin 218*d* of analog to digital converter 218 for the transfer of selected data from multiplexer 220 to analog to digital converter 218. Drive transistors 242*f, g, h,* and *i* are connected to actuator motor pins 208*f, g, h,* and *i* respectively to actuate actuator 208 in response to signals received from microcontroller 216. In the preferred embodiment, the actuator is controlled by a stepper motor, however, those skilled in the art will appreciate that any type of electrical, hydraulic, or pneumatic actuator could be used instead of a stepper motor if the proper interface is provided. Use of a stepper motor for actuator 208, however, minimizes the interface circuitry required to control the actuator from a digital source such as a microcontroller. Motion of the actuator is sensed by actuator position sensor 210. In the preferred embodiment, actuator position sensor 210 is a rotary variable differential transformer ("RVDT") because such sensors can accurately sense rotary motion, however, those skilled in the art will appreciate that other types of position sensors including electrical-resistive and electro-optical transducers could be used. In the present embodiment, pins 210*b, c,* and *d* of the actuator position sensor are connected to pins 224*b, c,* and *d* respectively of actuator position signal conditioner 224. Power supplies 226, connected to power sources 212 and ground 214, supply the necessary power to all system components in the control unit via the +15 volt output 274, the −15 volt output 276, and the +5 volt output 278. In the current embodiment, power supplies 226 supply power to actuator 208 and other peripheral devices, however, those skilled in the art will appreciate that peripheral devices such as the actuator 208, altitude encoder 202, and outside air temperature probe 204 may be provided with outside power supplies and merely be controlled by control unit 200.

The operational relationships between components within control unit 200, and between control unit 200 and peripheral devices such as the encoding altimeter 202 and outside air temperature probe 204, are controlled by a program run by microcontroller 216. Those skilled in the art will appreciate that a variety of programs could be developed to accomplish the control needs of this apparatus. The following description represents a preferred embodiment of the program designed to operate the control unit circuitry as shown in FIG. 8. The program used in the preferred embodiment comprises a main program, four program modules, and a subroutine.

Figure 9:
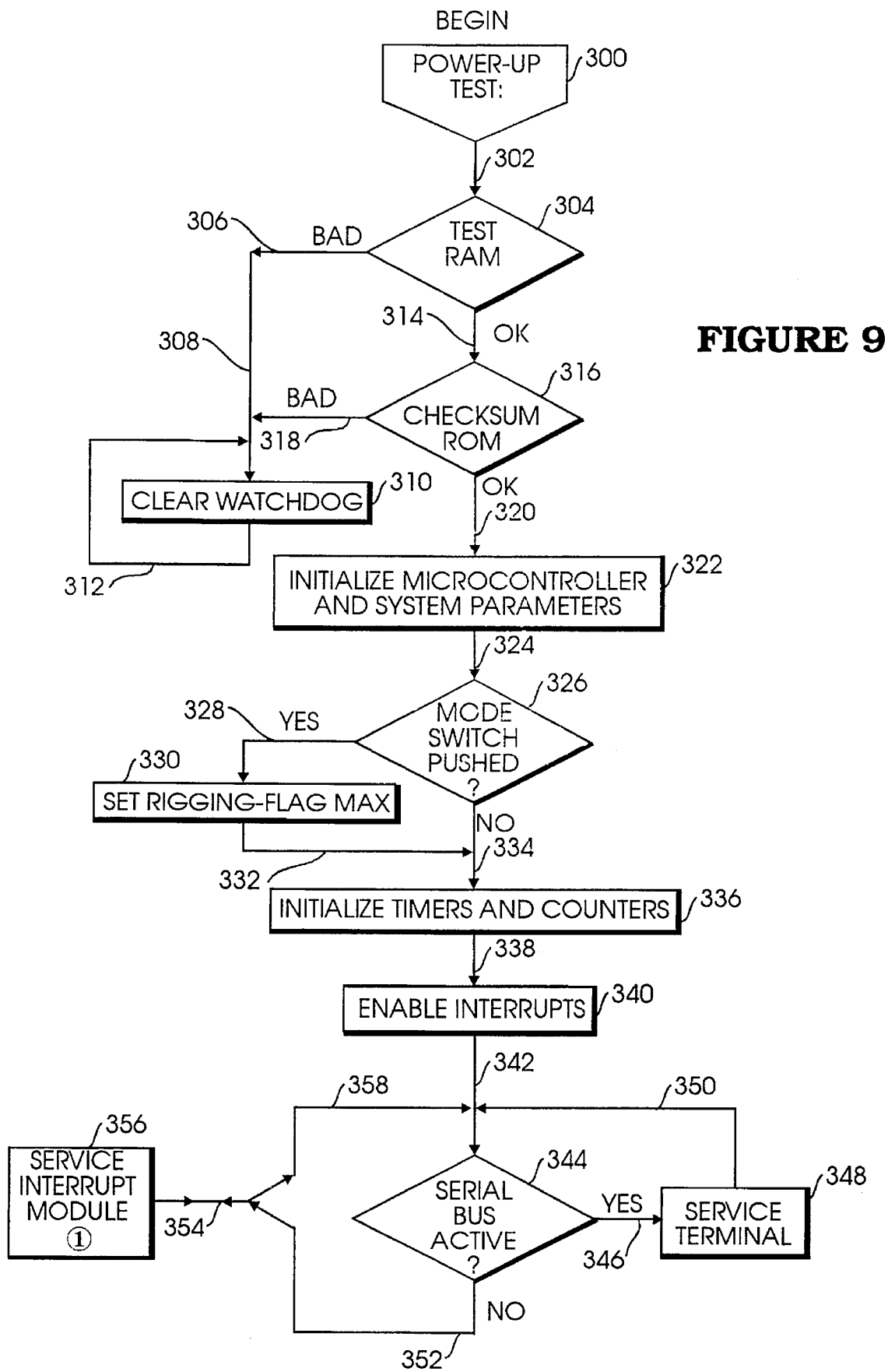
FIG. 9 is a block diagram of the power-up test and main program for a preferred embodiment of the control unit.

The main program of the preferred embodiment is shown in FIG. 9. The program begins at initial block 300 any time power is applied or reset by the power monitor chip 222. Initial block 300 is the beginning of the "power-up" test. Program flow proceeds through branch 302 to decision block 304. In decision block 304, the program checks and clears the random access memory (RAM) of the control unit. If the result of the RAM test is "bad", meaning that a malfunction has been detected in the RAM, the program proceeds via branches 306 and 308 to action block 310. In action block 310, the program activates watchdog circuit 230, causing it to turn on caution light 206 indicating to the pilot or operator that the system has a malfunction. The program then proceeds via branch 312 back to branch 308, forming a so-called "endless loop", causing the program to continuously illuminate the caution light and halting further progress of the program. If the result of the RAM test in decision block 304 is "OK", meaning that no malfunction is detected in the RAM, the system proceeds through branch 314 to decision block 316. In decision block 316, the program performs a "check-sum" test on the integrity of the program memory stored in read only memory (ROM). If the result of the check sum test is "bad", meaning that a problem has been detected in the program memory, the program proceeds through branches 318 and 308 to action block 310, activating the watch dog circuit to turn on the caution light and entering an endless loop as previous discussed. If the result of the check-sum test in decision block 316 is "OK", meaning that no malfunction has been detected in the program memory, then program flow proceeds through branch 320 to action block 322. Action block 322 represents the initialization step of the main program which initializes flags, the motor step pattern, self test flags, etc. Program flow then proceeds through branch 324 to decision block 326. In decision block 326, the program determines whether "rigging mode" was requested by holding in mode select switch 232 during power up. If the result of the mode-switched-pushed test in decision block 326 is "yes", meaning that the mode switch was pushed during power up, the program proceeds via branch 328 to action block 330. In action block 330, the program sets the rigging flag to indicate that rigging mode has been requested. Program flow then proceeds via branches 332 and 334 to action block 336. If the result of the mode-switch-pushed test in decision block 326 is "no", indicating that the mode switch was not depressed during power up, program flow proceeds through branch 334 to action block 336. In action block 336, the program sets values for the counter at 5 milliseconds (200 Hz) and the terminal baud rate for 1200 baud. Program flow then proceeds through branch 338 to action block 340. In action block 340, the program enables system interrupts. Program flow then proceeds through branch 342 to decision block 344. In decision block 344, the program determines whether the serial bus is active. If the result of the serial-bus-active test is "yes" meaning that signals are detected on the serial bus, program flow proceeds through branch 346 to action block 348. In action block 348, the program loads a terminal module containing a terminal handler routine allowing communication with the system. Once communication has been completed, the terminal module returns control to action block 348 and program flow continues via branches 350 and 342 back to decision block 344. If the result of the serial bus active test is "no", indicating that no signals are detected on the serial bus, the program proceeds through branches 352 and 354 to the service interrupt module 356 which will be described in greater detail below. Following completion of the service interrupt module, program flow continues via branches 354, 358 and 342 back to decision block 344. The program will continue to cycle through the "yes" loop, comprising blocks and branches 344, 346, 348, 350 and 342, or it will cycle through the "no" loop, comprising blocks and branches 344, 352, 354, 356, 358 and 342 as long as power is supplied to the system.

Figure 10:
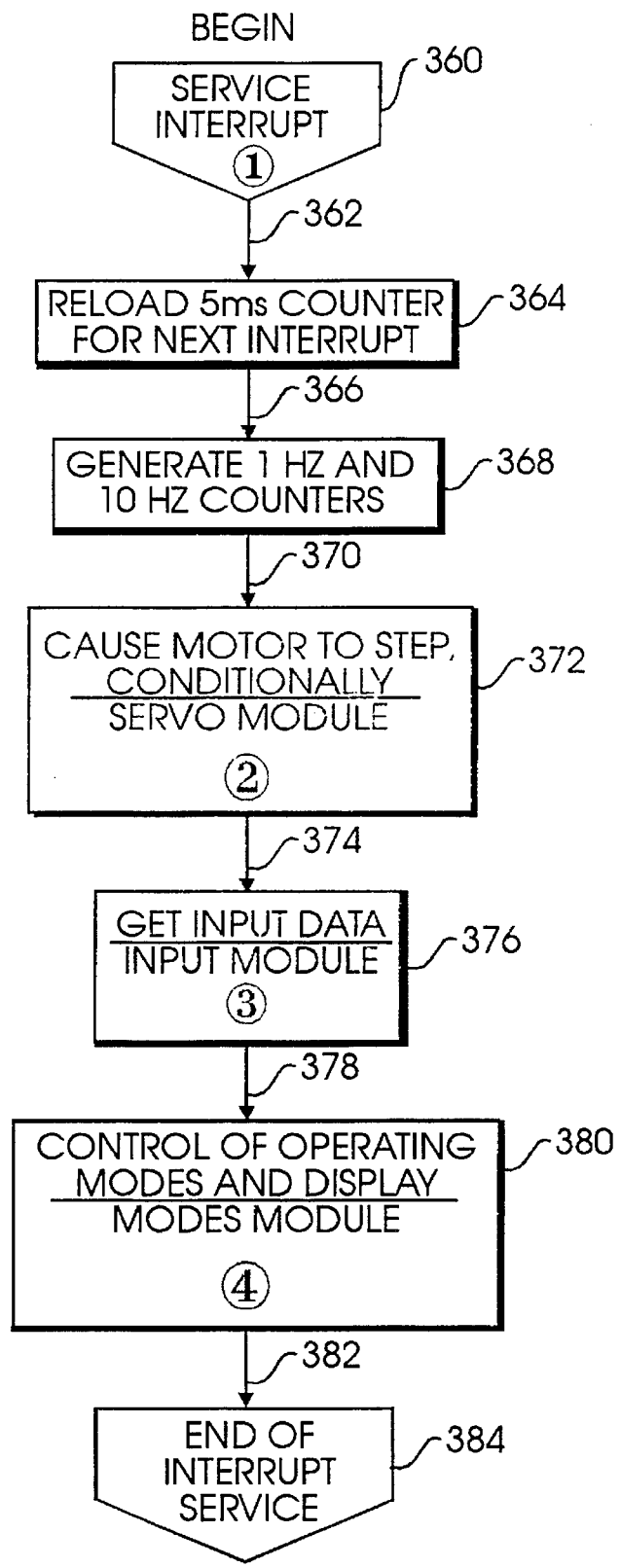
FIG. 10 is a block diagram of the Service Interrupt Module shown in FIG. 9.

The service interrupt module is shown in FIG. 10. Initial block 360 of the service interrupt module corresponds with block 356 of the main program shown in FIG. 9. Referring again to FIG. 10, program flow proceeds from initial block 360 via branch 362 to action block 364. In action block 364, the program reloads the five millisecond counter for the next interrupt cycle. Program flow then proceeds through branch 366 to action block 368. In action block 368, the program generates 1 Hz and 10 Hz counters. Program flow proceeds through branch 370 to action block 372. In action block 372, the program runs a "servo module" described in greater detail below. Depending upon the results returned by the servo module, the program may cause the actuator motor to step, thus changing the position of actuator 208. Program flow then proceeds through branch 374 to action block 376. In action block 376, the program runs a "input module", described in greater detail below, which obtains data on the ambient air conditions from the outside air temperature probe 204 and encoding altimeter 202. Program flow then proceeds through branch 378 to action block 380. In action block 380, the program runs a "modes module", described in greater detail below, which controls the selection of apparatus operating and display modes based on inputs received from the mode select switch 232. Program flow then proceeds through branch 382 to terminal block 384. Terminal block 384 represents the end of service interrupt module and program flow then proceeds back to block 356 shown in FIG. 9 and back into the main program via branch 354.

Figure 11:
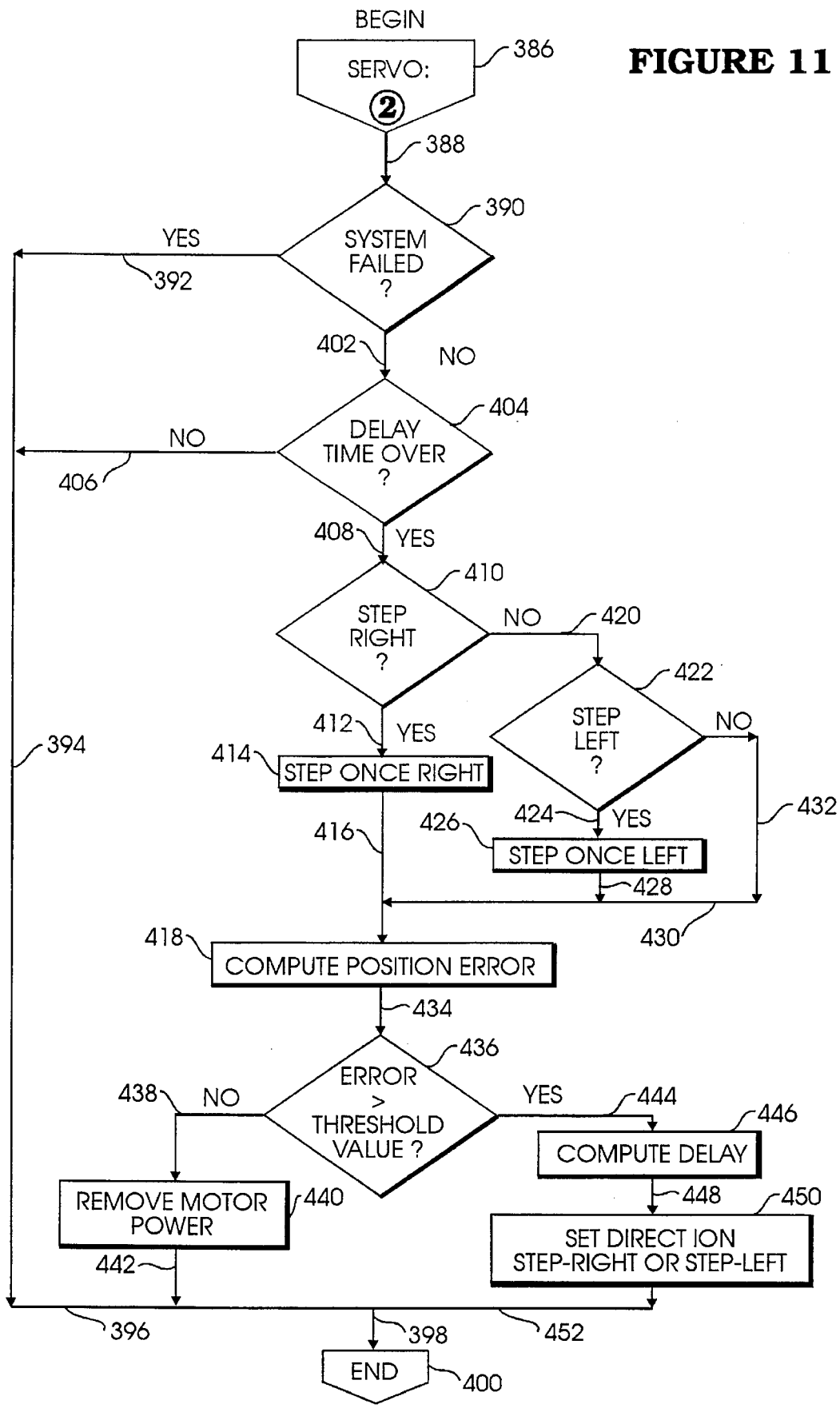
FIG. 11 is a block diagram of the Servo Module shown in FIG. 10.

FIG. 11 shows a detailed diagram of the servo module from action block 372 in FIG. 10. Referring again to FIG. 11, initial block 386 receives the program flow from action block 372 thus beginning the servo module. Program flow then proceeds through branch 388 to decision block 390. In decision block 390, the program checks the status of the system-failed flag. If the system-failed flag is set to "yes", indicating a system failure has been detected, then the program avoids stepping the actuator motor by proceeding via branches 392, 394, 396, and 398 to terminal block 400. From terminal block 400, program flow proceeds back to the service interrupt module at action block 372 in FIG. 10. If the system-failed test performed in decision block 390 results in a "no" status, indicating that no system failure has been detected, program flow proceeds via branch 402 to decision block 404. In decision block 404, the program checks to determine whether the next five millisecond period has elapsed. If the result of the delay-time-over check is "no", indicating it is not time to proceed, program flow proceeds via branches 406, 394, 396 and 398 to terminal block 400 and hence back to the service interrupt module as previously discussed. If the result of the delay-time-over check in decision block 404 is "yes", indicating that it is time for the program to proceed, program flow proceeds via branch 408 to decision block 410. In decision block 410, the program checks to see if a decision variable is set to "step right." If the result of the test in decision block 410 is "yes", meaning the variable is set to "step right," then program flow proceeds via branch 412 to action block 414. In action block 414, the program issues a command causing the actuator motor to step once to the right. Program flow then proceeds via branch 416 to action block 418. If the result of the test in decision block 410 was "no", meaning that direction variable was not set to "step right", program flow proceeds branch 420 to decision block 422. In decision block 422, the program checks to determine if the direction variable is set to "step left." If the result of the check in decision block 422 is "yes", meaning that the direction variable is set to "step left", program flow proceeds via branch 424 to action block 426. In action block 426, the program issues a command causing the actuator motor to step once to the left. Program flow then proceeds via branches 428, 430 and 416 to action block 418. If the result of the test in decision block 422 is "no", meaning that the direction variable was not set to "step left", program flow proceeds via branches 432, 430 and 416 to action block 418. In action block 418, the program determines an actuator position error by comparing an actuator position variable to an actuator position command variable. When the position error has been calculated, program flow proceeds via branch 434 to decision block 436. In decision block 436, the program determines whether the position error exceeds a predetermined threshold value. If the result of the check in decision block 436 is "no", meaning the that position error does not exceed predetermined threshold value, then it is not necessary to move the motor, thus program flow proceeds via branch 438 to action block 440. In action block 440, the program removes power from the actuator motor and it remains in its current position. Program flow then proceeds via branches 442, 396 and 398 to terminal block 400, where program flow is returned to the service interrupt module as previously discussed. If the result of the test in decision block 436 is "yes", meaning the position error exceeds the predetermined threshold value, then it is necessary to reposition the actuator, thus program flow proceeds via branch 444 to action block 446. In action block 446, the program computes a delay variable necessary to allow the actuator motor the time for physical movement. Program flow then proceeds via branch 448 to action block 450. In action block 450, the program sets the direction variable to "step right" or "step left" depending on the sign value of the error previously determined. Program flow then proceeds via branches 452 and 398 to terminal block 400 where control is returned to the service interrupt module as previously discussed.

Figure 12A:
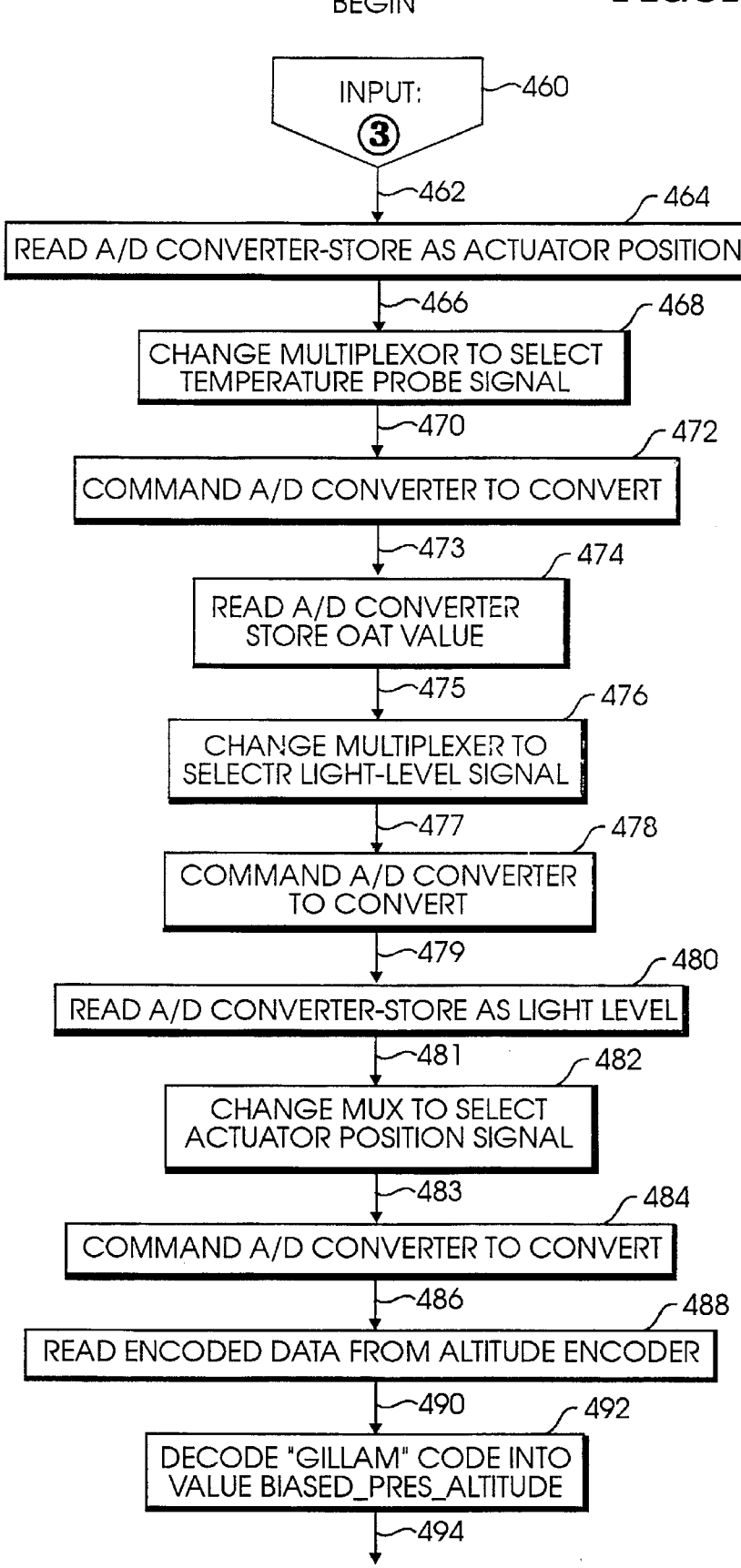
FIGS. 12a and 12b are block diagrams of the Input Module shown in FIG. 10.
Figure 12B:
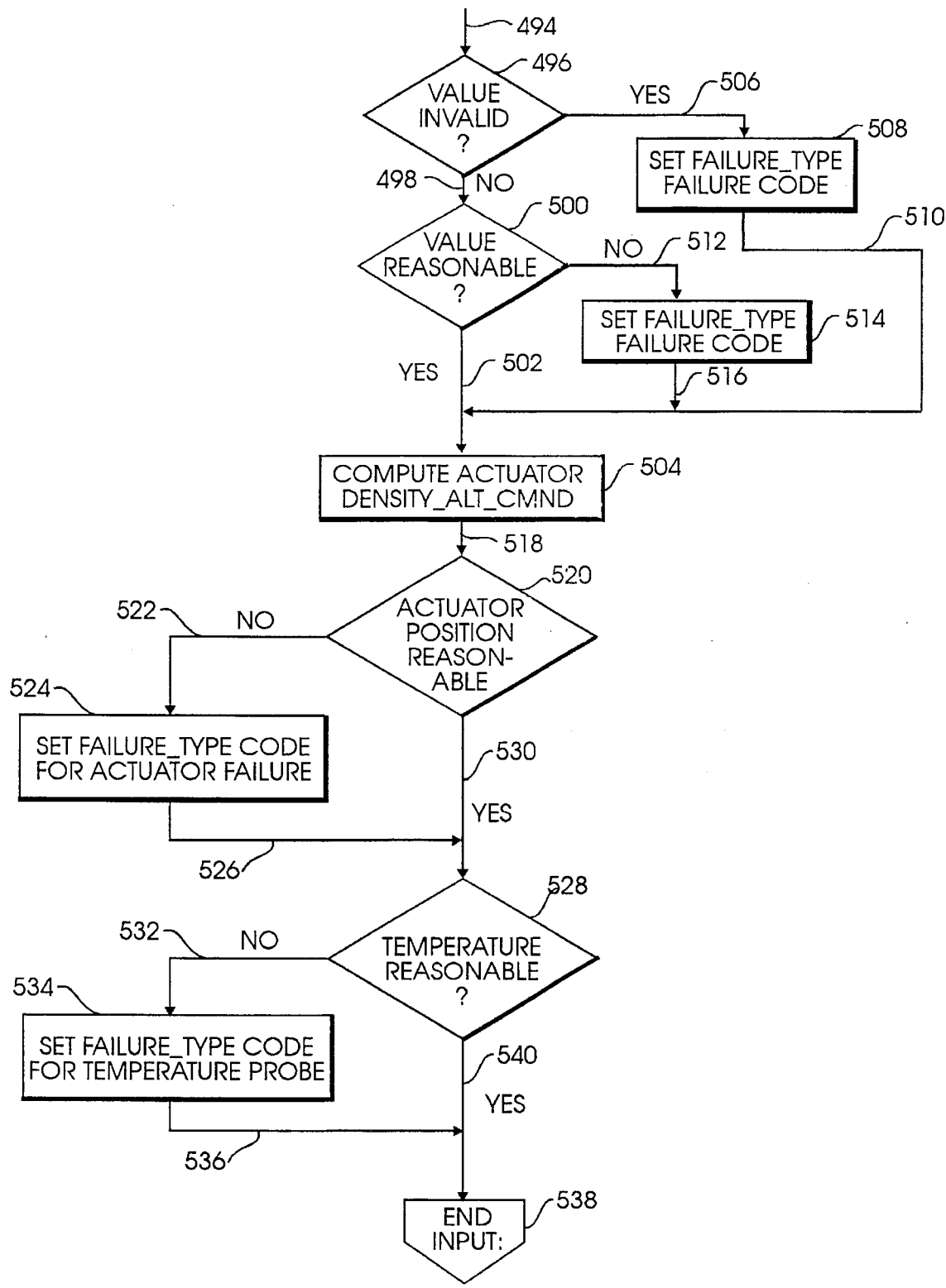

Referring to FIGS. 12a and 12b, a detailed description can be provided for the input module referred to in action block 376 of FIG. 10. Referring to FIG. 12a, initial block 460 receives program flow from action block 376 in FIG. 10. Initial block 460 begins the input module. Program flow proceeds via branch 462 to action block 464. In action block 464, the program causes microcontroller 216 to access analog-to-digital converter 218 to obtain an actuator position value and to store the value for later use. Program flow then continues via branch 466 to action block 468. In action block 468, the program directs microcontroller 216 to access multiplexer 220 and command multiplexer 220 to select the temperature probe signal received from outside air temperature probe 204. Program flow then proceeds via branch 470 to action block 472. In action block 472, microcontroller 216 commands analog-to-digital converter 218 to convert the analog signal received from outside air temperature probe 204 into a digital signal. Program flow then proceeds via branch 473 to action block 474. In action block 474, microcontroller 216 reads analog-to-digital converter 218 to obtain a value for outside air temperature and stores this value for later use. Program flow then proceeds via branch 475 to action block 476. In action block 476, microcontroller 216 directs multiplexer 220 to select the light level signal received from light sensor 240. Program flow then proceeds via branch 477 to action block 478. In action block 478, microcontroller 216 commands analog-to-digital converter 218 to convert the analog light level signal obtained from light sensor 240 into a digital signal. Program flow then proceeds via branch 479 to action block 480. In action block 480, microcontroller 216 reads analog-to-digital converter 218 to attain a value for light level and stores this value for later use. Program flow then proceeds via branch 481 to action block 482. In action block 482, microcontroller 216 directs multiplexer 220 to select an actuator position signal received from actuator position signal conditioner 224 which reflects the position of actuator 208 as measured by actuator position sensor 210. Program flow then proceeds via branch 483 to action block 484. In action block 484, microcontroller 216 commands analog-to-digital converter 218 to convert the analog signal received from actuator position signal conditioner 224 into a digital signal. Program flow then proceeds via branch 486 to action block 488. In action block 488, microcontroller 216 reads encoded digital data from encoding altimeter 202. Program flow then proceeds via branch 490 to action block 492. In action block 492, the program decodes the "Gillam" code used by encoding altimeter 202 into a biased pressure altitude value. The biased pressure altitude value is equal to the actual altitude value plus 1200 feet. Program flow then proceeds via branch 494 to decision block 496. Referring to FIG. 12b, in decision block 496, the program tests the validity of the biased pressure altitude value. If the result of decision block 496 is "no", meaning the value for the biased pressure altitude is valid, program flow proceeds via branch 498 to decision block 500. In decision block 500, the program tests to determine if the value for the biased pressure altitude is reasonable. If the result of decision block 500 is "yes", indicating that the value for biased pressure altitude is reasonable, then program flow proceeds via branch 502 to action block 504. If the result of decision block 496 is "yes", meaning the value for biased pressure altitude is invalid, then program flow proceeds via branch 506 to action block 508. In action block 508, the program sets a variable corresponding to the type of failure which occurred. In this case, the failure type variable would be set to a value corresponding to invalidity. The program flow then proceeds via branches 510 and 502 to action block 504. If the result of decision block 500 was "no", meaning that the value for bias pressure altitude was found not reasonable, program flow proceeds via branch 512 to action block 514. In action block 514, program sets the failure-type variable to a value corresponding to a reasonableness failure, rather than a validity failure as done in action block 508. By accessing these failure code variables, user or maintenance personnel can determine the type of failure which has occurred. From action block 514, program flow proceeds via branches 516, 510 and 502 to action block 504. In action block 504, the program runs a subroutine, DENS-ALT, described in greater detail below, which calculates the density altitude based on stored values for the outside air temperature and pressure altitude. The subroutine also calculates an actuator command value corresponding to the maximum pitch of the tail rotor blades desired for the calculated density altitude. The values for density altitude and actuator command are returned from the DENS-ALT subroutine to action block 504. Program flow then proceeds via branch 518 to decision block 520. In decision block 520, the actuator position value generated by the subroutine in action block 504 is checked to insure that it corresponds with a position within the actuator travel limits. If the result of the test in decision block 520 is "no", meaning the actuator position value corresponds to a position outside the actuator travel limits, program flow proceeds via branch 522 to action block 524. In action block 524, the program sets the failure-type variable to a value corresponding to actuator failure. Program flow then proceeds via branches 526 and 530 to decision block 528. If the result of the test in decision block 520 is "yes", meaning that the value for the actuator position is within the actuator travel limits, program flow proceeds via branch 530 to decision block 528. In decision block 528, previously stored value for the outside air temperature is checked for reasonableness. If the result of the test in decision block 528 is "no", meaning the outside air temperature value is not reasonable, program flow proceeds via branch 532 to action block 534. In action block 534, the program sets the failure type variable to a value corresponding to the temperature probe failure. Program flow then proceeds via branches 536 and 540 to terminal block 538. From terminal block 538, program flow returns to the service interrupt module at action block 376 as shown in FIG. 10. If the result of the test in decision block 528 is "yes", meaning that the outside air temperature value is reasonable, then program proceeds via branch 540 to terminal block 538, and then back to the service interrupt module at action block 376 as previously discussed.

Figure 13A:
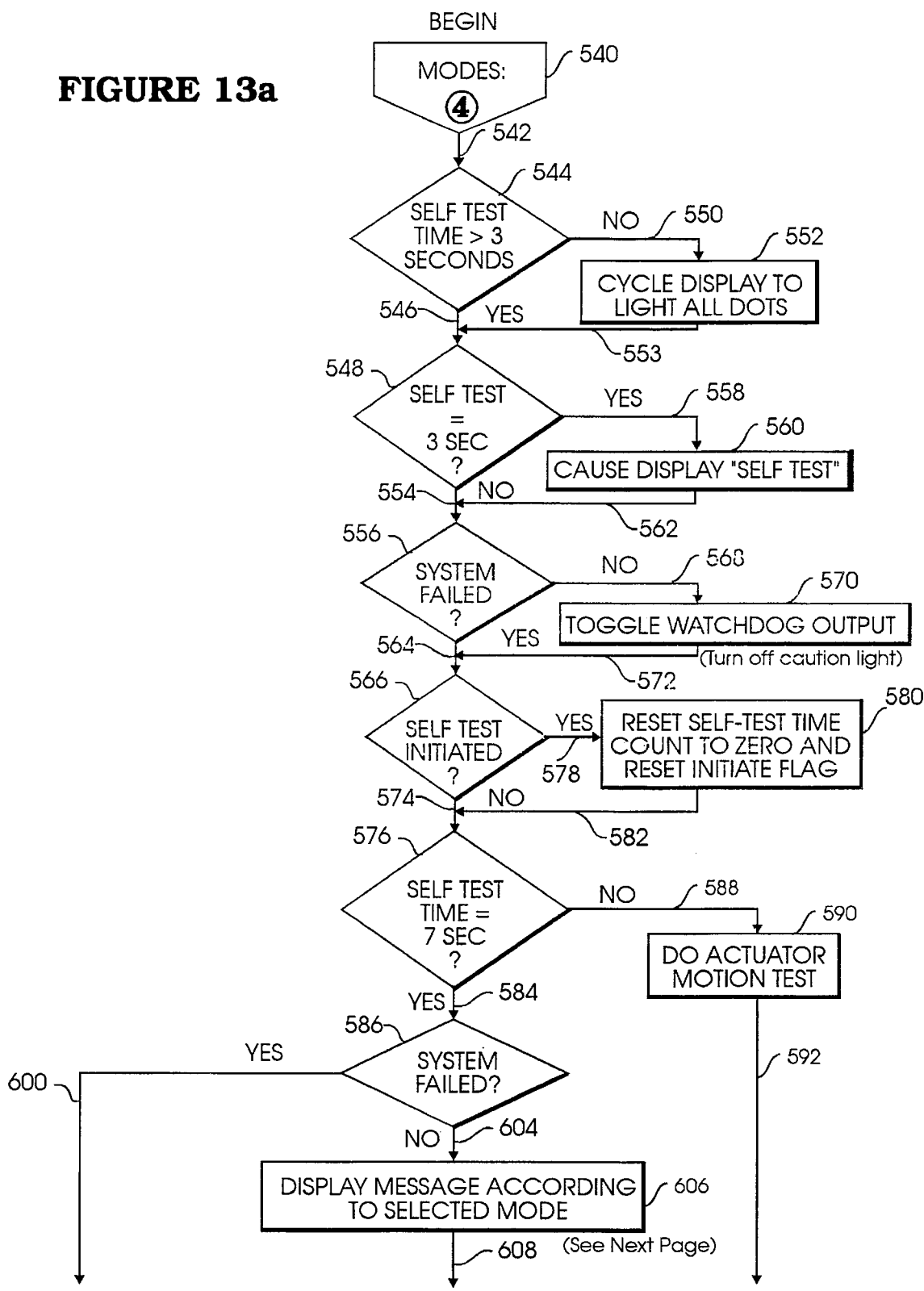
Figure 13C:
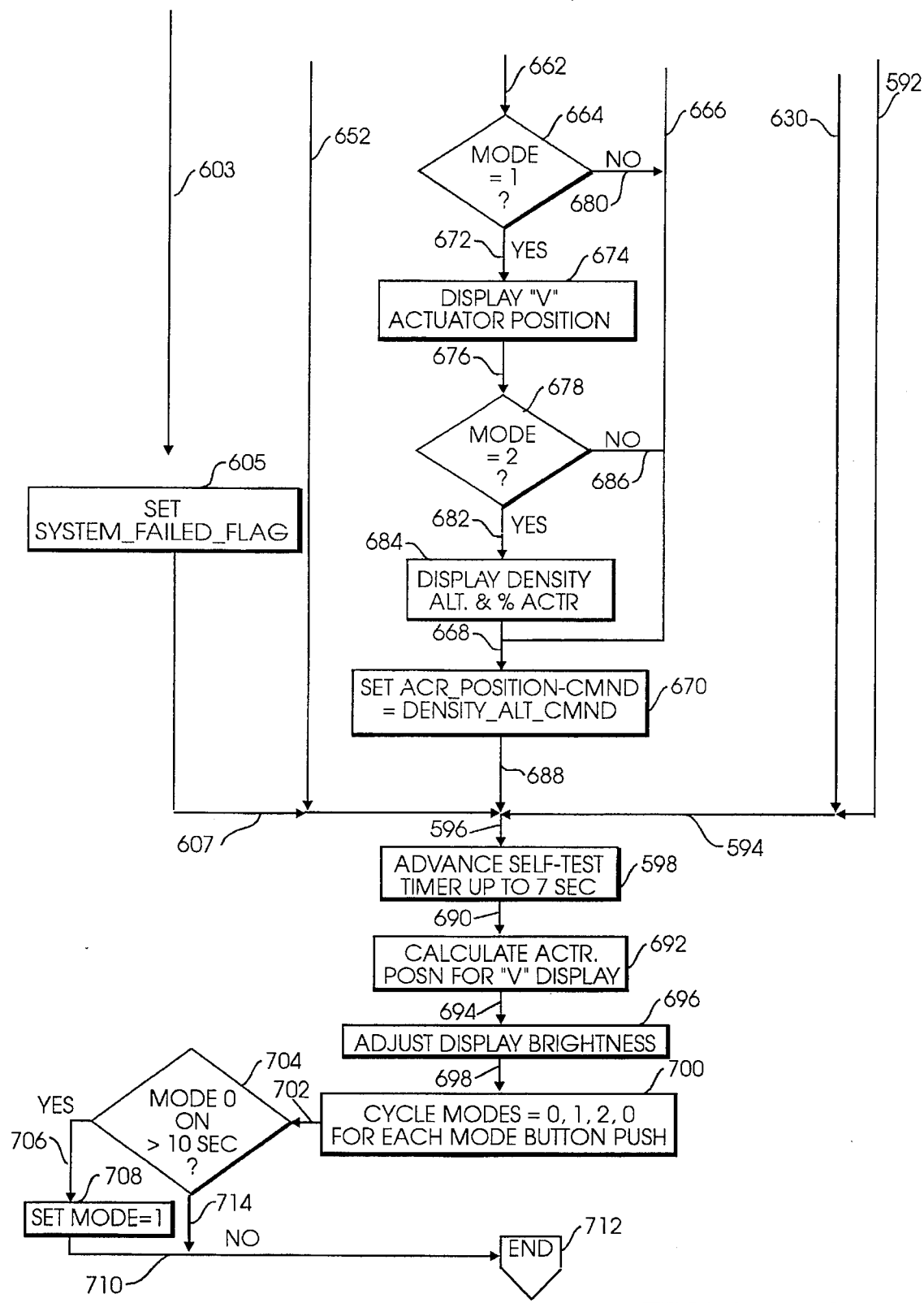

FIGS. 13a, 13b, and 13c show a detailed diagram of the modes module from action block 380 in FIG. 10. Referring again to FIG. 13a, 13c, initial block 540 receives the program flow from action block 380, thus beginning the modes module. Program flow then proceeds through branch 542 to decision block 544. In decision block 544, the program checks to see if the self-test time has exceeded three seconds. If the result of decision block 544 is "yes", meaning that the self-test time has exceeded three seconds, program flow proceeds via branch 546 to decision block 548. If the result of decision block 544 is "no", meaning that self-test time has not exceeded three seconds, then the program flow proceeds via branch 550 to action block 552. In action block 552, microcontroller 216 cycles display chips 228 to light all dots to verify their proper functioning. Program flow then proceeds via branches 553 and 546 to decision block 548. In decision block 548, the program checks to see if the self-test time equals three seconds. If the result of decision block 548 is "no", meaning that self-test time is not equal to three seconds, program flow proceeds via branch 554 to decision block 556. If the result of decision block 548 is "yes", meaning that the self-test time is equal to three seconds, program flow proceeds via branch 558 to action block 560. In action block 560, microcontroller 216 causes display chips 228 to display "self-test" to indicate that the self-test program is running. Program flow then proceeds via branches 562 and 554 to decision block 556. In decision block 556, the program checks variables corresponding to system failure. If the result of the test in decision block 556 is "yes", meaning a system failure is detected, program flow proceeds via branch 564 to decision block 566. If this occurs, microcontroller 216 will not toggle watch dog circuit 230, allowing caution light 206 to be lighted. If the result of decision block 556 is "no", indicating that no system failure has been detected, program flow will proceed via branch 568 to action block 570. In action block 570, microcontroller 216 will toggle watch dog circuit 230 causing it to turn off caution light 206 so that a system failure is not indicated. Program flow will then proceed via branches 572 and 564 to decision block 566. The preceding operations serve to illuminate all dots on the display chips and the caution light for three seconds to test that they are in working order. At the end of the three second period, the display chips indicate that the self-test begins. In decision block 566, the program checks a system variable to detect when the self-test is initiated. When the result of decision block 566 is "no", indicating that the initiation of a self-test has not been detected, program flow proceeds via branch 574 to decision block 576. When the result of decision block 566 is "yes", indicating that self-test initiation has been detected, program flow proceeds via branch 578 to action block 580. In action block 580, the program resets the self-test time count to zero and resets the initiate flag. Program flow then proceeds via branches 582 and 574 to decision block 576. In decision block 576, the program tests to see if the self-test time equals seven seconds. If the result of the test in decision block 576 is "yes", meaning that the self-test time equals seven seconds, program flow proceeds via branch 584 to decision block 586. If the result of the test in decision block 576 is "no", meaning that the self-test time does not equal seven seconds, program flow proceeds via branch 588 to action block 590. In action block 590, the microcontroller begins an actuator motor test. Program flow then proceeds via branches 592, 594 and 596 to action block 598. In decision block 586, the program checks the failure codes to see if a system failure is indicated. If the result of the test in decision block 586 is "yes", indicating that a system failure has been detected program flow proceeds via branch 600 to action block 602. In action block 602, microcontroller 216 commands display chips 228 to display a message according to the type of failure detected. Program flow then proceeds via branch 603 to action block 605. In action block 605, program sets the system fail flag to indicate that a system failure has occurred. Program flow then proceeds via branches 607 and 596 to action block 598. If the result of the test in decision block 586 is "no", indicating that no system failure has been detected, program flow proceeds via branch 604 to action block 606. In action block 606, microcontroller 216 directs display chips 228 to display a message according to the selected mode. Program flow then proceeds via branch 608 to decision block 610. In decision block 610, the program determines whether "rigging mode" has been requested. Rigging mode is a feature allowing the user to command the system to assume either a maximum pitch condition or a minimum pitch condition regardless of ambient air conditions. This feature may be useful for maintenance or other procedures. If the result of decision block 610 is "no", meaning that rigging mode has not been requested by operating the mode select button 232, program flow proceeds via branch 612 to decision block 614. If the result of the test in decision block 610 is "yes", meaning that rigging mode has been requested, program flow proceeds via branch 616 to decision block 618. In decision block 618, microcontroller 216 checks the actuator position signal produced by actuator position sensor 210 to determine if the actuator is in the full right position. If the result of the test in decision block 618 is "no", indicating that the actuator is not in the full right position, program flow proceeds via branch 620 to action block 622. In action block 622, microcontroller 216 commands display units 228 to display "rig min" to indicate that the system is rigging for minimum pitch. Program flow then proceeds via branch 624 to action block 626. In action block 626, the program sets the actuator command value to its minimum value. Program flow then proceeds via branches 628, 630, 594 and 596 to action block 598. If the result of the test in decision block 618 is "yes", indicating that maximum tail rotor pitch is desired, program flow proceeds via branch 632 to action block 634. In action block 634, microcontroller 216 directs display chips 228 to display "rig max", indicating that maximum blade pitch has been selected. Program flow then proceeds via branch 636 to action block 638. In action block 638, the actuator command value is set to maximum so that the actuator motor will operate until the tail rotor blades have been set to maximum pitch. Program flow then proceeds via branches 630, 594 and 596 to action block 598. In decision block 614, the program tests to see if self-test has been initiated. If the result of the test in decision block 614 is "yes", meaning that a self-test has been initiated, program flow proceeds via branch 640 to action block 642. In action block 642, a variable "1 bit flag" is set to indicate that a self-test has been initiated. Program flow then proceeds via branch 644 to action block 646. In action block 646, microcontroller 216 commands display units 228 to clear the display. Program flow proceeds via branch 648 to action block 650. In action block 650, the program instructs the microcontroller to conduct a test of the EEPROM. Program flow then proceeds via branches 652, 607 and 596 to action block 598. If the result of the test in decision block 614 is "no", meaning that a self-test has not been initiated, program flow proceeds via branch 654 to decision block 646. In decision block 656, the program checks to see if mode 0 has been selected. If the result of the test in decision block 656 is "yes", meaning that mode 0 has been selected, program flow proceeds via branch 568 to action block 660. In action block 660, microcontroller 216 directs display units 228 to display the altitude and temperature. Program flow then proceeds via branch 662 to decision block 664. If the result of the test in decision block 656 is "no", meaning that mode 0 has not been selected, program flow proceeds via branches 666 and 668 to action block 670. In decision block 664, the program tests if mode 1 has been selected. If the result of the test in decision block 664 is "yes", meaning that mode 1 has been selected, program flow proceeds via branch 672 to action block 674. In action block 674, microcontroller 216 commands display units 228 to display a "V" character to provide a graphic indication of the actuator position. The "V" character will move from right to left across the display corresponding to movements of the actuator from a minimum altitude setting to a maximum altitude setting. Program flow then continues via branch 676 to decision block 678. If the result of the test in decision block 664 is "no", meaning that mode 1 has not been selected, program flow proceeds via branches 680, 666 and 668 to action block 670. In decision block 678, the program tests to see if mode 2 has been selected. If the result of the test in decision block 678 is "yes", meaning that mode 2 has been selected, program flow proceeds via branch 682 to action block 684. In action block 684, microcontroller 216 commands display units 228 to display density altitude and actuator command value. Program flow then proceeds via branch 668 to action block 670. If the result of the test in decision block 678 is "no", meaning that mode 2 has not been selected, program flow proceeds via branches 686, 666 and 668 to action block 670. In action block 670, the program sets the actuator position command to the value of the density altitude command. Program flow then proceeds via branches 688 and 596 to action block 598. In action block 598, the program advances the self-test timer to time equal seven seconds. Program flow then proceeds via branch 690 to action block 692. In action block 692, the program calculates the actuator position to be used for the graphic "V" display on the display unit. Program flow then proceeds via branch 694 to action block 696. In action block 696, the program adjusts the display brightness to correspond to the values received from light sensor 240. Program flow then proceeds through branch 698 to action block 700. In action block 700, the program cycles endlessly through modes 0, 1 and 2 for each push of the mode select button 232. Program flow then proceeds via branch 702 to decision block 704. In decision block 704, the program tests to see if mode 0 has been selected for more than ten seconds. If the result of the test in decision block 704 is "yes", meaning that mode 0 has been selected for more than ten seconds, program flow proceeds via branch 706 to action block 708. In action block 708, mode is set to mode 1. Program flow then proceeds via branch 710 to terminal block 712. From terminal block 712, program flow returns to the service interrupt module at action block 380 shown in FIG. 10. If the result of the test in decision block 704 is "no", meaning that mode 0 has not been selected for more than ten seconds, program flow proceeds via branches 714 and 710 to terminal block 712. Program flow proceeds from terminal block 712 back to service interrupt module as previously discussed.

Figure 14:
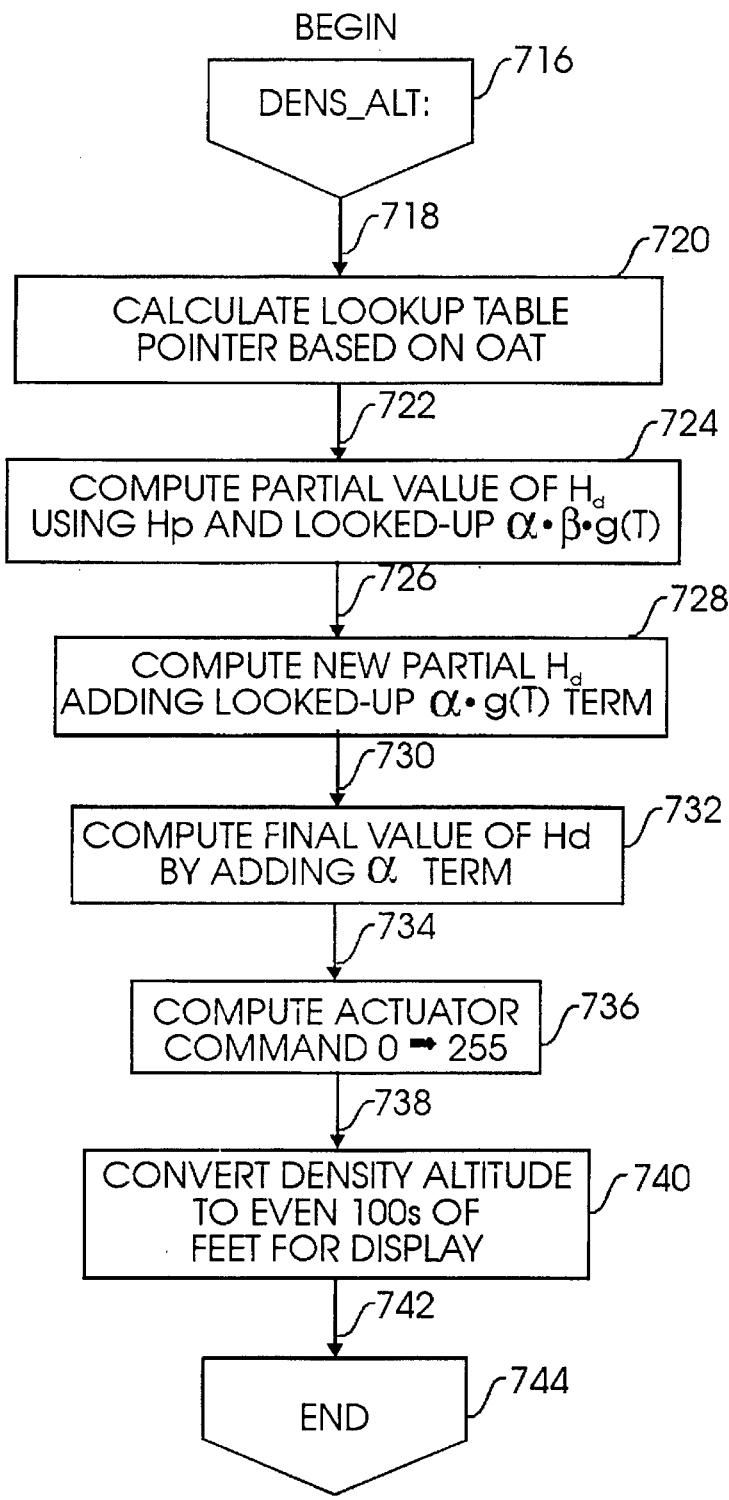
FIG. 14 is a block diagram of the Density Altitude Subroutine shown in FIG. 12b.

FIG. 14 shows a detailed diagram of the density altitude subroutine, DENS-ALT, from block 504 on FIG. 12b. Referring again to FIG. 14, initial block 716 receives the program flow from action block 504 in FIG. 12b, thus beginning the density altitude subroutine. Program flow then proceeds via branch 718 to action block 720.

The standard atmosphere equation for density altitude is:

$$H_d = \alpha \times [1-(T_o/T)^{1/4.256} \times (1-(H_p/\alpha))^{1.235}],$$

where $\alpha=519/0.00357$ feet, $T_0$ is standard sea level temperature in °K. and T is the OAT in °K.

The preferred embodiment uses an approximation method which results in insignificant errors compared to the standard atmosphere equation.

The factor $(T_o/T)^{1/4.256}$ is defined as g(T) and $$H_d = \alpha - \alpha \times g(T) + \alpha \times H_p \times \beta \times g(T)$$

values of $\epsilon*g(T)$, and $\alpha*\beta*g(T)$ are looked up from two tables of values pointed by, or indexed to T (which is OAT in °K.). $\beta$ is a constant determined by analysis to yield the least error from the approximation determined to be $8.4 \times 10^{-6}$ (1/feet).

In action block 720, the program calculates a look-up table pointer based on the absolute value of outside air temperature, OAT. The pointer values are used to compute two terms of the approximation, these terms being stored in two look-up tables. The look-up tables each contain 250 values, each 0.5 degrees K. apart, from 430 degrees K. to 680 degrees K. Those skilled in the art will appreciate that direct calculation could be used by a program instead of a look-up table to accomplish the same result. The program flow then proceeds via branch 722 to action block 724. In action block 724, the program computes a partial value of $H_d$ using two pointer-indexed table values: $\alpha*\beta*g(T)$ and biased $H_p$, where $H_d$ is the density altitude and $H_p$ is the pressure altitude. The program flow then proceeds via branch 726 to action block 728. In action block 728, the program computes a new partial $H_d$ including the $\alpha*g(T)$ term. For this calculation the program uses the look-up table values for $\alpha*g(T)$. The program flow then proceeds via branch 730 to action block 732. In action block 732, the program computes a final $H_d$ value by adding $\alpha$ to the partial result obtained earlier. Program flow then proceeds via branch 734 to action block 736. In action block 736, the program computes an actuator command value ranging from 0 to 255. These values are selected to correspond to a range of density altitudes equal to 3,000 to 7,000 feet. The program flow then proceeds via branch 738 to action block 740. In action block 740, the program converts density altitude to even hundreds of feet for display purposes. Using fixed-point calculations, the program uses the relation $H_d=[H_d/100] \times 100$ to accomplish this rounding, however, it could be done using other functions to accomplish the same result. Program flow then proceeds via branch 742 to terminal block 744. From terminal block 744, program flow returns to the input module at action block 504 on page 12b.

While several embodiments of the invention have been illustrated in the accompanying drawings and described in the foregoing detailed description, it will be understood that the invention is not limited to the embodiments disclosed, but is capable of numerous rearrangements, modifications, and substitutions of parts and elements without departing from the spirit of the invention.

We claim:

1. An apparatus for interconnection in a helicopter tail rotor control linkage for changing the maximum pitch of the tail rotor blades in response to inputs, said apparatus comprising:
   (a) a linkage member having a variable geometry;
       said linkage member connected between a first portion of said tail rotor control linkage and a second portion of said tail rotor control linkage;
       said variable geometry having a range of configurations corresponding to predetermined variations in the maximum pitch of the tail rotor blades;
   (b) an actuator connected to said linkage member;
       said actuator changing said configuration of said variable geometry in response to an actuator movement signal;
   (c) a control unit;
   said control unit providing said actuator movement signal to said actuator in response to sensor inputs to said control unit; and
   d) sensors to detect ambient air conditions and which provide said sensor inputs to said control unit.

2. The apparatus of claim 1, wherein said sensors comprise a pressure altitude detector.

3. The apparatus of claim 2 wherein said sensors comprise an outside air temperature detector.

4. The apparatus of claim 1, further comprising an actuator position sensor to detect an actuator position and provide an actuator position signal corresponding to said actuator position.

5. The apparatus of claim 4, further comprising a first display receiving said actuator position signal and providing a visual indication of said actuator position and said configuration of said variable geometry.

6. The apparatus of claim 1, further comprising a visual display to provide a status indication corresponding to a parameter of said apparatus.

7. The apparatus of claim 1, further comprising:
   (a) an actuator position sensing device;
       said device connected to said control unit and providing an actuator position signal corresponding to said actuator position and said configuration of said variable geometry;
   (b) a pressure altitude sensing device;
       said device connected to said control unit and providing a pressure altitude signal corresponding to ambient air conditions; and
   (c) a outside air temperature sensing device;
       said device connected to said control unit and providing an outside air temperature signal corresponding to said ambient air conditions;
   (d) wherein said control unit further comprises a microcontroller; said microcontroller:
       (i) monitoring said pressure altitude signal, said outside air temperature signal, and said configuration signal;
       (ii) determining a density altitude value corresponding to said pressure altitude signal and outside air temperature signal;
       (iii) determining a desired actuator position corresponding to a desired configuration of said variable geometry corresponding to a desired maximum pitch of the tail rotor blades corresponding to said density altitude value;

(iv) comparing said desired actuator position to said actuator position signal and determining a position error value corresponding to the difference therebetween; and (v) conditionally providing said actuator movement signal to said actuator in response to said position error value.

8. The apparatus of claim 7, wherein said microcontroller determines said density altitude value using the equation:

$$H_d = \alpha \times [1-(T_o/T)^{(1/4.256)} \times (1-(H_p/\alpha))^{1.235}]$$

where $H_d$=approximated density altitude value $\alpha$="standard atmosphere"=145,378 feet $T_o$=519° R.

T=outside air temperature (°R.)

$H_p$=pressure altitude (feet).

9. The apparatus of claim 7, wherein said microcontroller determines said density altitude value using the approximation:

$$H_d = \alpha - (\alpha \times g(T)) + (\alpha \times H_p \times \beta g(T))$$

where:

$H_d$=approximated density altitude value $\alpha$="standard atmosphere"=145,378 feet $\beta$=8.4×10⁻⁶ (1/feet)

$T_o$=519° R.

T=outside air temperature (°R.)

$g(T)=(T_o/T)^{(1/4.256)}$ $H_p$=pressure altitude (feet).

10. An apparatus for interconnection in a helicopter tail rotor control linkage for changing the maximum pitch of the tail rotor blades in response to inputs, said apparatus comprising:

(a) a stop member having a variable position within a range of positions; said stop member located proximate to, and in a first direction relative to, a movable link of said tail rotor control linkage; said stop member blocking further movement of said movable link in said first direction;

(b) an actuator connected to said stop member for selectively changing said variable position in response to an actuator position command; and (c) a control unit providing said actuator position command to said actuator in response to sensor inputs to said control unit; and d) sensors to detect ambient air conditions and which provide said sensor inputs to said control unit.

11. An apparatus for interconnection in a helicopter tail rotor control linkage for changing the pitch of the tail rotor blades in response to predetermined inputs, said apparatus comprising:

(a) a linkage member having a variable geometry;

said linkage member connected between a first portion of said tail rotor control linkage and a second portion of said tail rotor control linkage and further comprising:

(i) a main lever having a main pivot point, a first linkage connection point, a secondary lever connection point, and a first actuator connection point;

said main pivot point for connection to a fixed portion of the helicopter;

said first linkage connection point for connection to said first portion of the tail rotor control linkage;

said first actuator connection point for connection to a first portion of said actuator; and (ii) a secondary lever having a main lever connection point, a second linkage connection point, and a second actuator connection point;

said main lever connection point pivotally connected to said secondary lever connection point of said main lever;

said second linkage connection point for connection to said second portion of said tail rotor control linkage;

said second actuator connection point connected to a second portion of said actuator;

(b) an actuator connected to said linkage member;

said actuator changing said configuration of said variable geometry in response to an actuator movement signal; and (c) a control unit;

said control unit providing said actuator movement signal to said actuator in response to said inputs to said control unit.

12. The apparatus of claim 11, wherein a first maximum pitch of the tail rotor blades corresponding to a first direction of control pedal travel is not varied but a second maximum pitch of the tail rotor blades corresponding to an opposite direction of control pedal travel is varied.

13. The apparatus of claim 12, wherein said linkage member and said tail rotor control linkage further comprise:

(a) said linkage member and said tail rotor control linkage dimensioned such that when said control pedals are at maximum travel in said first direction, movement of said actuator through a range of actuator positions corresponding to a predetermined range of ambient air conditions, from a first ambient air condition corresponding to a lowest value of said second maximum pitch of the tail rotor blades to a second ambient air condition corresponding to a highest value of said second maximum pitch of the tail rotor blades, will produce no appreciable rotation of said linkage member, whereby no appreciable variation of said first maximum pitch of the tail rotor blades in said first direction is produced; and (b) said linkage member and said tail rotor control linkage further dimensioned such that when said control pedals are at maximum travel in said opposite direction, movement of said actuator through said range of actuator positions corresponding to said predetermined range of ambient air conditions will produce a rotation of said linkage member and a movement of said tail rotor control linkage such that said pitch of the tail rotor blades in said opposite direction will vary from said lowest value of said second maximum pitch of the tail rotor blades to said highest value of said second maximum pitch of the tail rotor blades.

14. An apparatus for interconnection in a helicopter tail rotor control linkage for changing the pitch of the tail rotor blades in response to predetermined inputs, said apparatus comprising:

(a) a linkage member having a variable geometry;

said linkage member connected between a first portion of said tail rotor control linkage and a second portion of said tail rotor control linkage and further comprising:
(i) a main lever having first and second linkage connection points, a secondary lever connection point, and a first actuator connection point;
said first linkage connection point for connection to said first portion of said tail rotor control linkage;
said second linkage connection point for connection to said second portion of said tail rotor control linkage;
said first actuator connection point connected to a first portion of said actuator; and
(ii) a secondary lever having a main pivot point, a main lever connection point, and a second actuator connection point;
said main pivot point for connection to a fixed portion of the helicopter;
said main lever connection point pivotally connected to said main lever at said secondary lever connection point;
said second actuator connection point connected to a second portion of said actuator;
(b) an actuator connected to said linkage member;
said actuator changing said configuration of said variable geometry in response to an actuator movement signal; and
(c) a control unit;
said control unit providing said actuator movement signal to said actuator in response to said inputs to said control unit.

15. An apparatus for interconnection in a helicopter tail rotor control linkage for changing the maximum pitch of the tail rotor blades in response to inputs, said apparatus comprising:
(a) a linkage member having a variable geometry;
said linkage member connected between a first portion of said tail rotor control linkage and a second portion of said tail rotor control linkage;
said variable geometry having a range of configurations corresponding to
predetermined variations in the maximum pitch of the tail rotor blades;
(b) an actuator connected to said linkage member;
said actuator changing said configuration of said variable geometry in response to an actuator movement signal;
(c) a control unit;
said control unit providing said actuator movement signal to said actuator in response to setting inputs to said control unit; and
(d) a manually operated switch having a plurality of switch settings corresponding to a plurality of predetermined maximum pitches of the tail rotor blades and which provides said setting inputs to said control unit.

* * * * *

UNITED STATES PATENT AND TRADEMARK OFFICE
CERTIFICATE OF CORRECTION

PATENT NO. : 5,607,122
DATED : March 4, 1997
INVENTOR(S) : Hicks et al.

It is certified that error appears in the above-indentified patent and that said Letters Patent is hereby corrected as shown below:

Column 2, line 46, delete "$H_a$", insert --$H_d$--.

Column 3, line 11, before "overstressing", delete "the", insert --thus--.

Column 23, line 18, delete "$H_d = \alpha \times [\ 1 - (T_o/T)^{1/4.256} \times (1-(H_p/\alpha))^{1.235}\ ]$", insert --$H_d = \alpha \times [\ 1 - (T_o/T)^{(1/4.256)} \times (1-(H_p/\alpha))^{1.235}\ ]$--.

Column 23, line 24, delete "$(T_o/T)^{1/4.256}$", insert --$(T_o/T)^{(1/4.256)}$--.

Column 23, line 28, delete "$\epsilon * g(T)$", insert --$\alpha * g(T)$--.

Column 25, Claim 9, line 4, delete "$H_d = \alpha - (\alpha \times g(T)) + (\alpha \times H_p \times \beta\ g(T))$", insert --$H_d = \alpha - (\alpha \times g(T)) + (\alpha \times H_p \times \beta \times g(T))$ --.

Signed and Sealed this

Eighth Day of July, 1997

*Attest:*

*Attesting Officer*

BRUCE LEHMAN
*Commissioner of Patents and Trademarks*